US008979382B2

(12) United States Patent
Niwa

(10) Patent No.: US 8,979,382 B2
(45) Date of Patent: Mar. 17, 2015

(54) ROLLING BEARING

(75) Inventor: Tsuyoshi Niwa, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/118,946

(22) PCT Filed: May 8, 2012

(86) PCT No.: PCT/JP2012/061751
§ 371 (c)(1),
(2), (4) Date: Nov. 20, 2013

(87) PCT Pub. No.: WO2012/160958
PCT Pub. Date: Nov. 29, 2012

(65) Prior Publication Data
US 2014/0086520 A1 Mar. 27, 2014

(30) Foreign Application Priority Data

May 24, 2011 (JP) ................................. 2011-115686

(51) Int. Cl.
F16C 19/00 (2006.01)
F16C 33/58 (2006.01)
F16C 35/063 (2006.01)
F16C 35/067 (2006.01)
F16C 19/16 (2006.01)
F16C 19/36 (2006.01)

(52) U.S. Cl.
CPC ............... *F16C 33/58* (2013.01); *F16C 35/063* (2013.01); *F16C 35/067* (2013.01); *F16C 33/585* (2013.01); *F16C 19/163* (2013.01); *F16C 19/364* (2013.01)
USPC .......................................... 384/450; 384/513

(58) Field of Classification Search
CPC .......................... F16C 2240/12; F16C 2240/18

USPC .................................................. 384/450, 513
See application file for complete search history.

(56) References Cited

U.S. PATENT DOCUMENTS 5,951,173 A * 9/1999 Matsui et al. .................. 384/513
7,249,892 B2 * 7/2007 Takemura et al. ............. 384/450
(Continued)

FOREIGN PATENT DOCUMENTS

JP 2001-001710 1/2001
JP 2005-257012 9/2005
(Continued)

OTHER PUBLICATIONS

International Search Report issued Jun. 5, 2012 in International (PCT) Application No. PCT/JP2012/061751.
(Continued)

Primary Examiner — Phillip A Johnson
(74) Attorney, Agent, or Firm — Wenderoth, Lind & Ponack, L.L.P.

(57) ABSTRACT

With the inner race and shaft fitted with a clearance fit, the bearing satisfies the relation: t/w>0.5, where t is an inner race minimum thickness at a contact area between each rolling element and the inner race raceway, in the direction perpendicular to the raceway, and w is the circumferential distance between adjacent rolling elements (w=π×SD/Z, Z is the number of rolling elements, and SD is the bearing inner diameter). With the outer race and housing fitted with a clearance fit, the bearing satisfies the relation: t/w>0.5, where t is the inner race minimum thickness at a contact area between each rolling element and the outer race raceway, in the direction perpendicular to the raceway, and w is the circumferential distance between adjacent rolling elements (w=π×LD/Z, LD is the bearing inner diameter).

20 Claims, 18 Drawing Sheets (a)

(b)

(c)

(56) References Cited

U.S. PATENT DOCUMENTS

| | | |
|---|---|---|
| 2003/0081872 A1 | 5/2003 | Sahashi et al. |
| 2006/0291759 A1* | 12/2006 | Koyama et al. ............... 384/450 |
| 2007/0140611 A1 | 6/2007 | Chifu et al. |
| 2009/0215569 A1 | 8/2009 | Shibukawa et al. |

FOREIGN PATENT DOCUMENTS

| | | |
|---|---|---|
| JP | 2008008409 A * | 1/2008 |
| JP | 2009-204016 | 9/2009 |
| JP | 2010-025155 | 2/2010 |

OTHER PUBLICATIONS

Mechanics of Materials, vol. 2; published by Yokendo; written by Ichiro Nakamura, Honorary Professor, Tokyo Institute of Technology; Chapter 6: Contact Stress, mentioned in paragraph [0089] of the specification (with partial English translation).

Press release "Development creep-free bearings" (Public Relations Department, NSK Ltd., Jun. 27, 2007) http:jp.nsk.com/company/presslounge/news/2007/press070627.html.

NSK Technical Journal No. 680 (2006) pp. 13-18 "Mechanism of creeping of bearing outer race" (with English Abstract).

* cited by examiner

Fig. 1
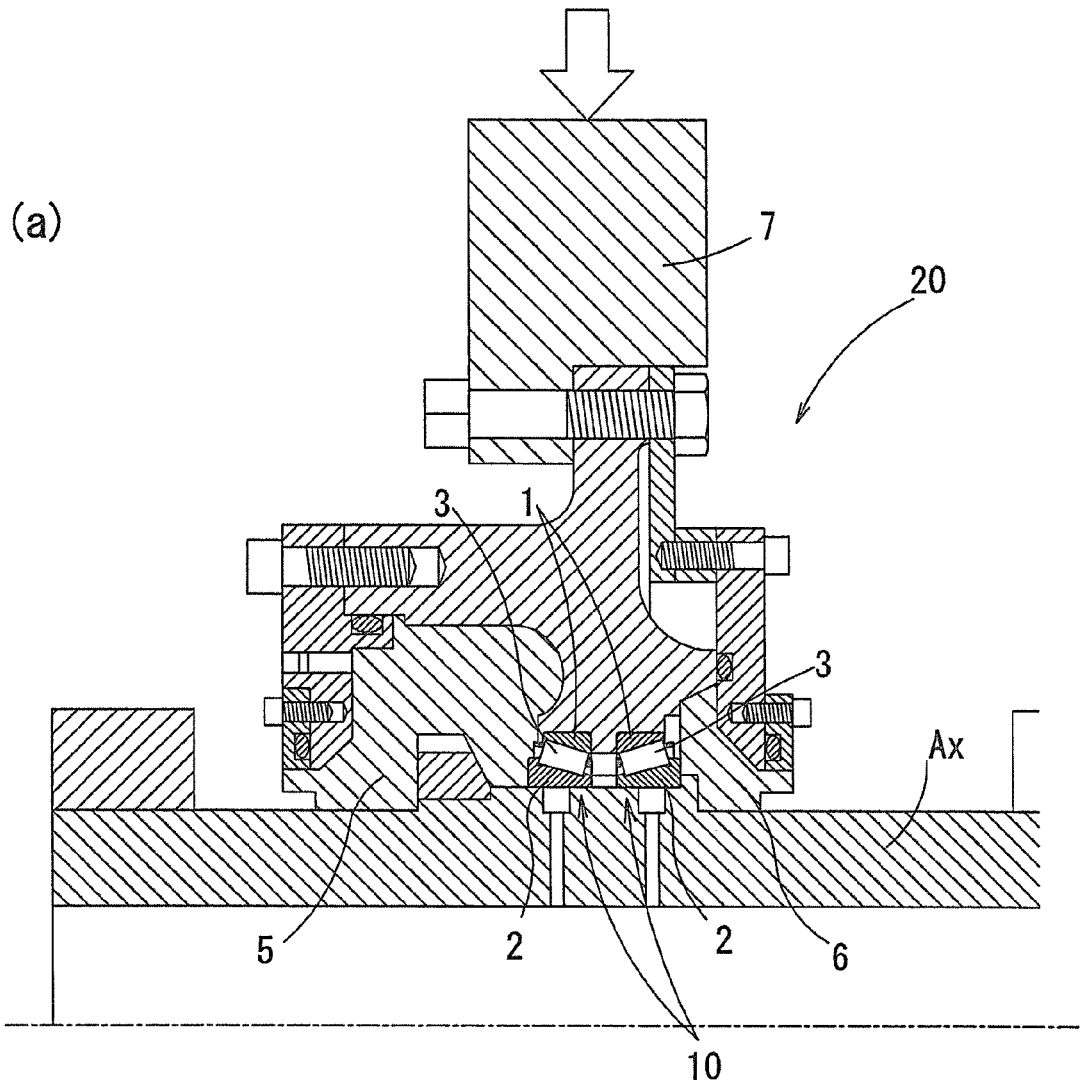
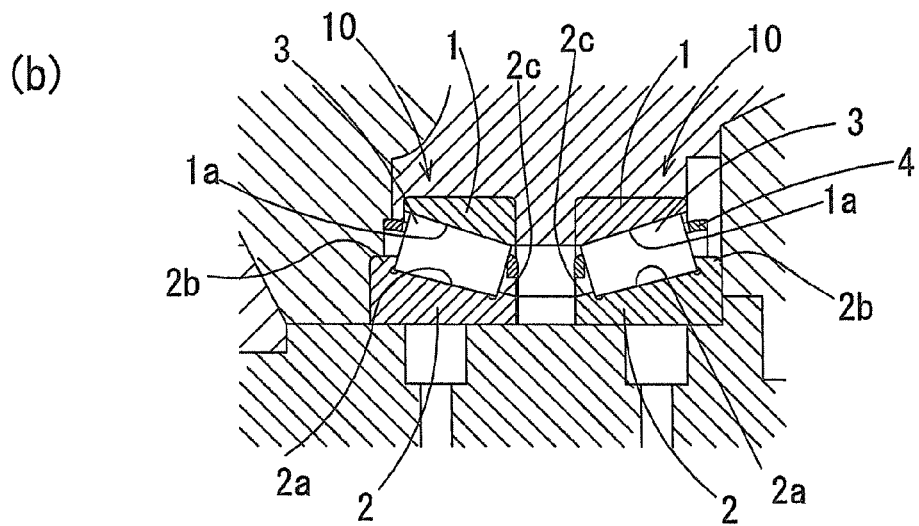

Fig.2
(a)
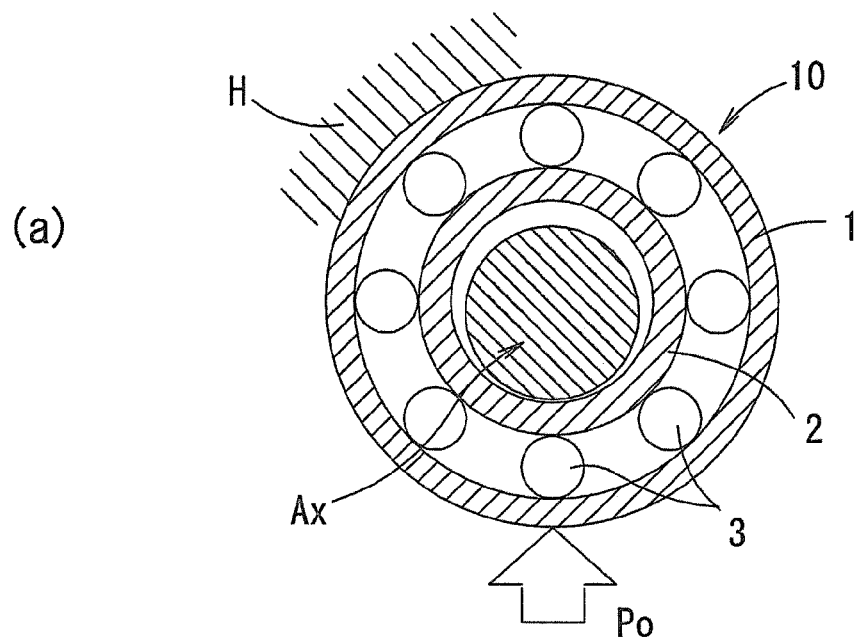
(b)
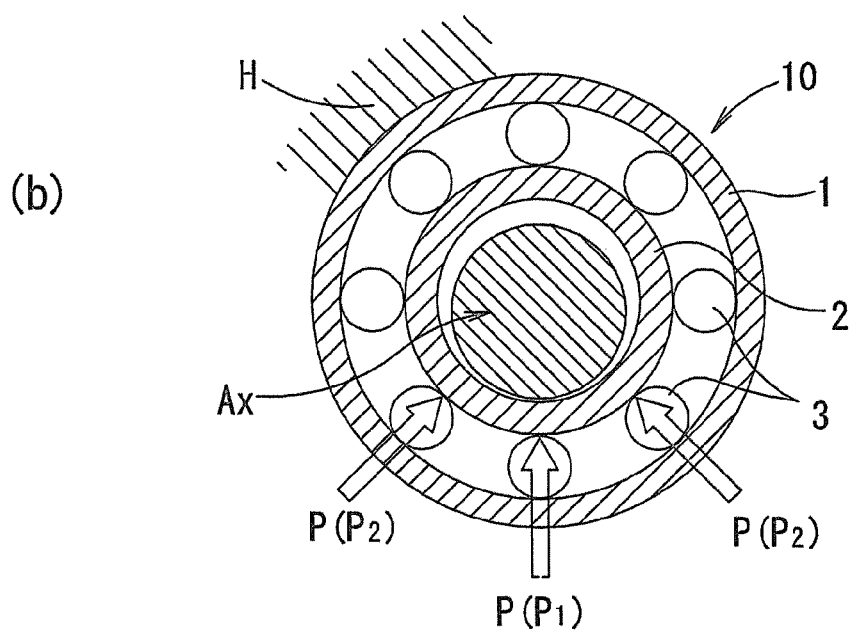

Fig.5
(a)
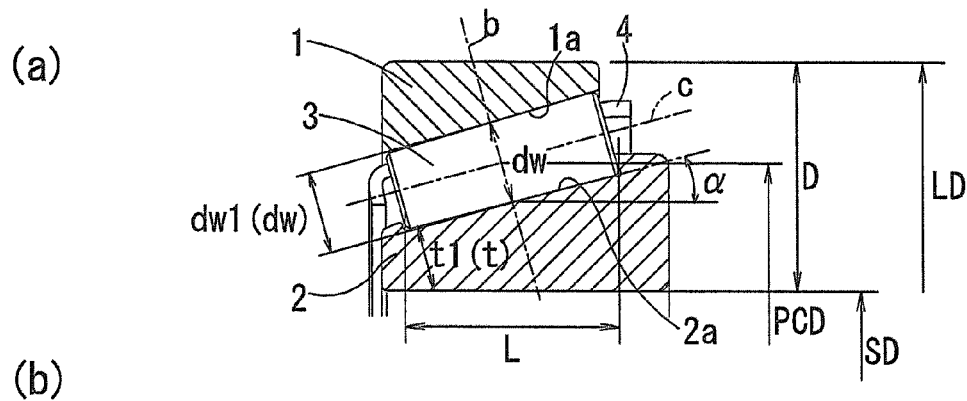
(b)
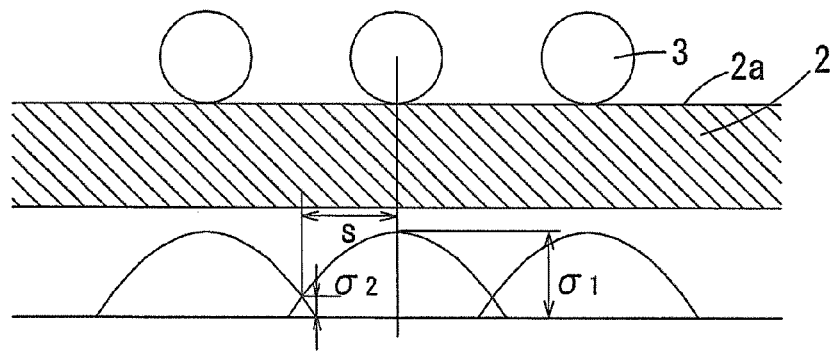
(c)
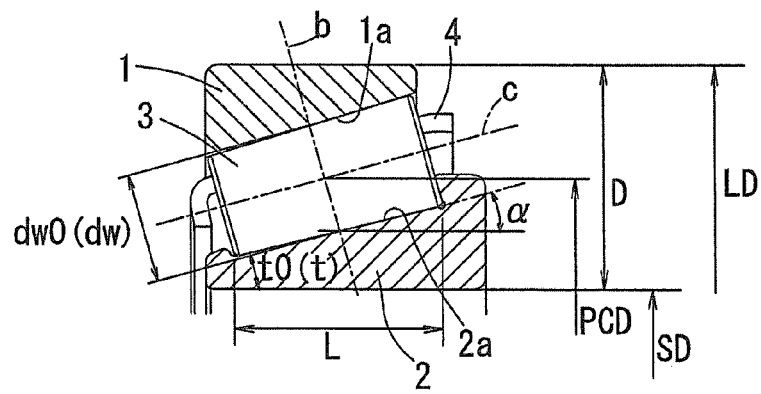
(d)
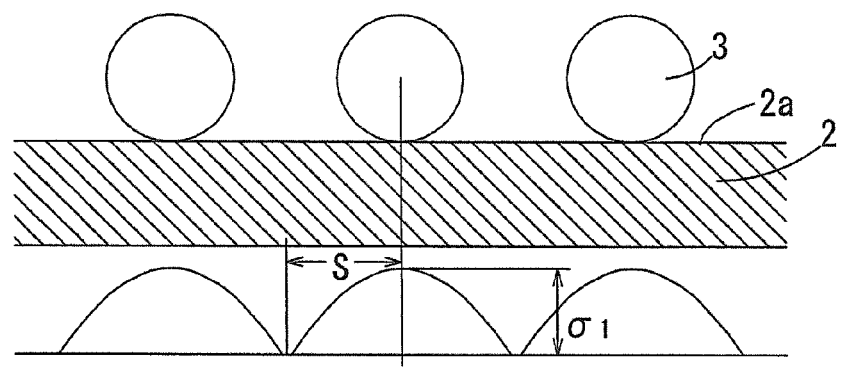

Fig 6
(a)
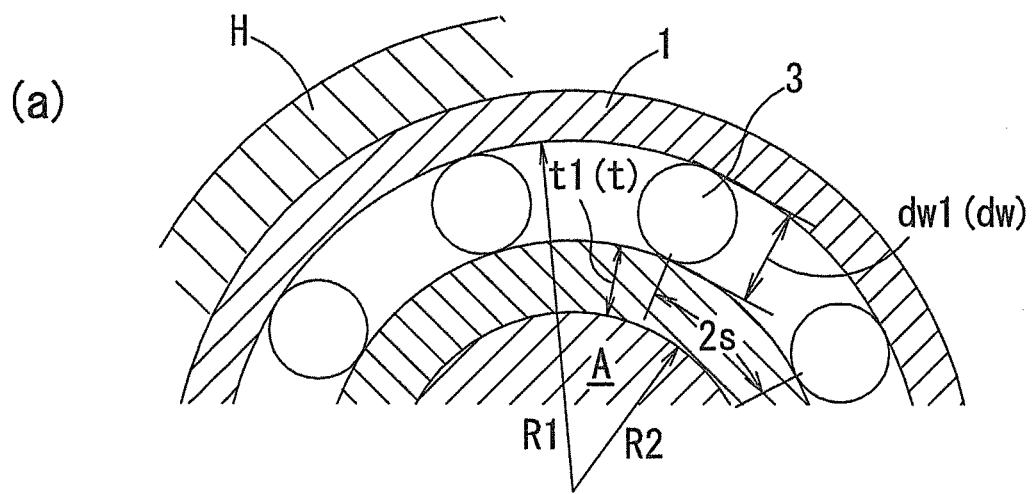
(b)
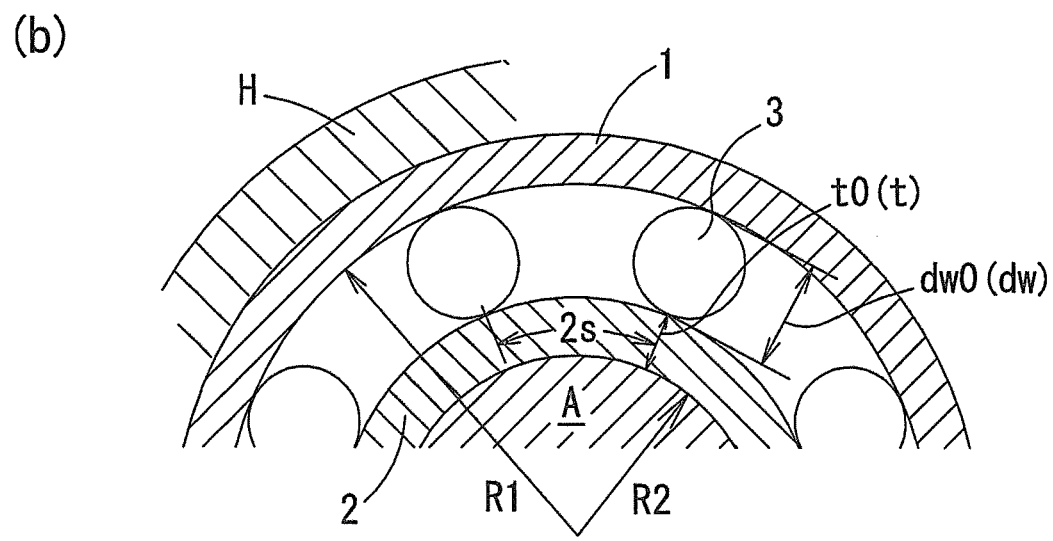

Fig 8
(a)
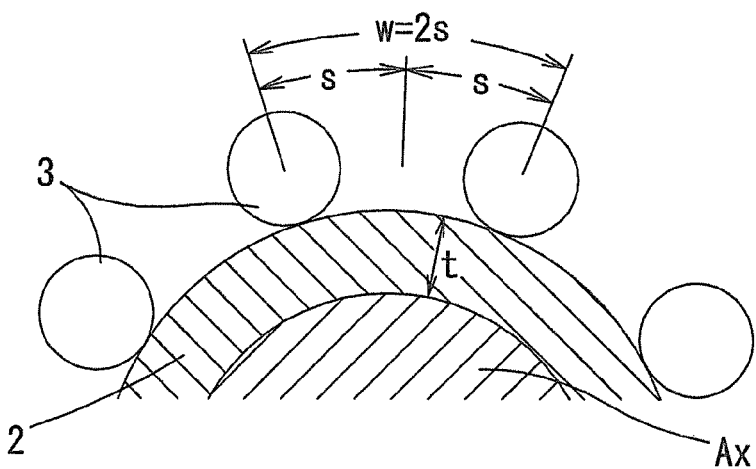
(b)
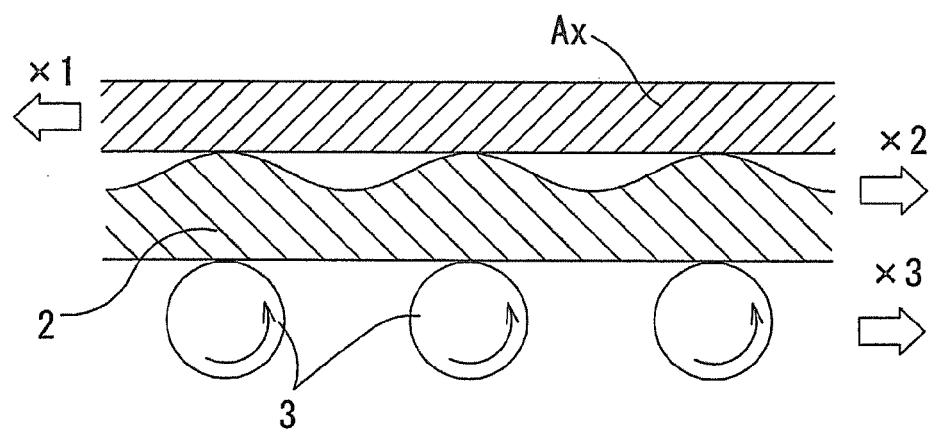
(c)
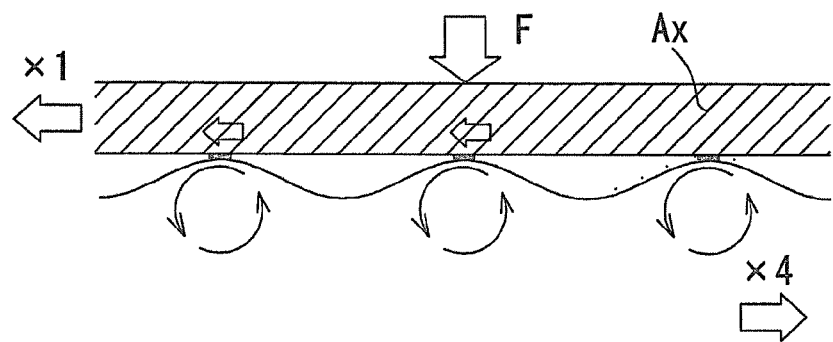

Fig. 13
(a)
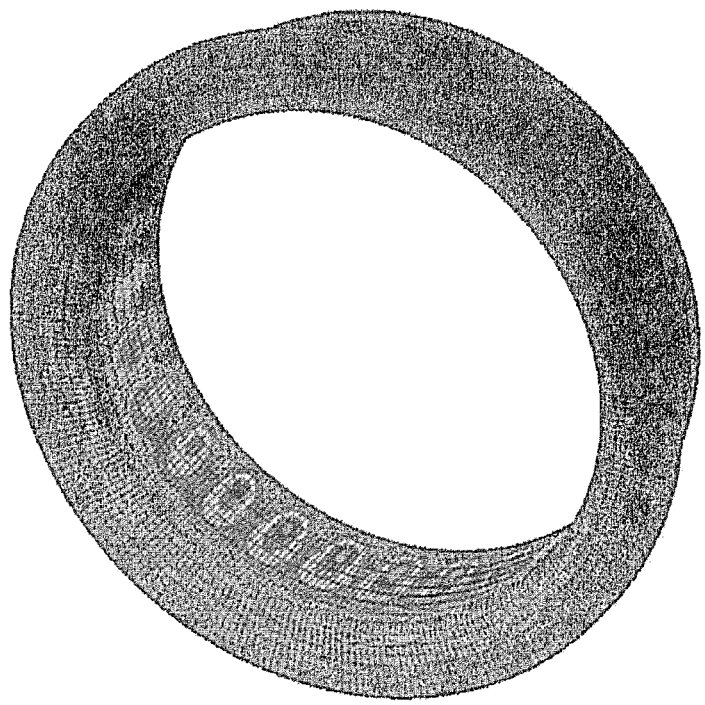
(b)
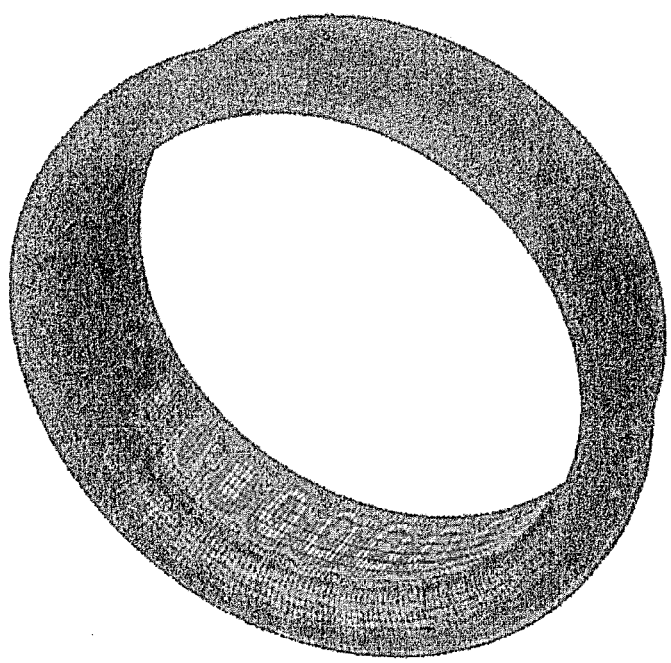

Fig.14
(a)
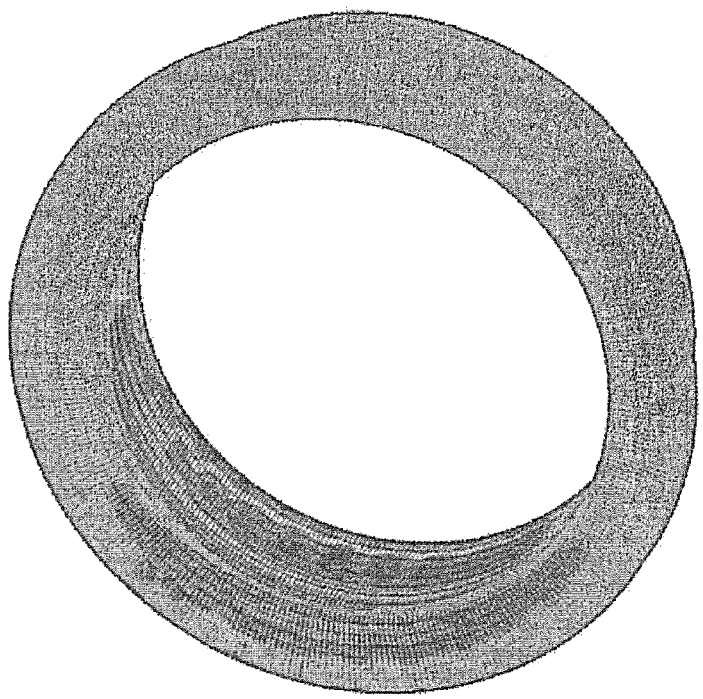
(b)
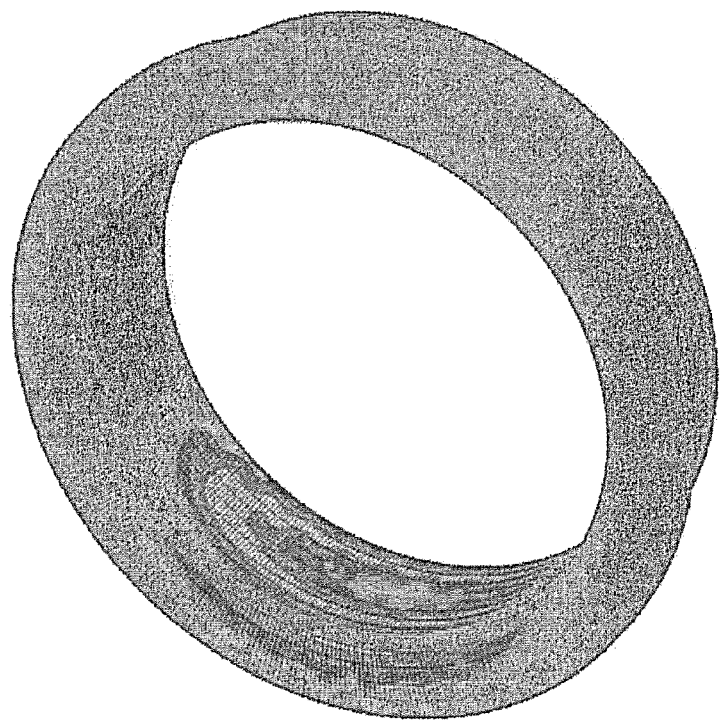

Fig. 15
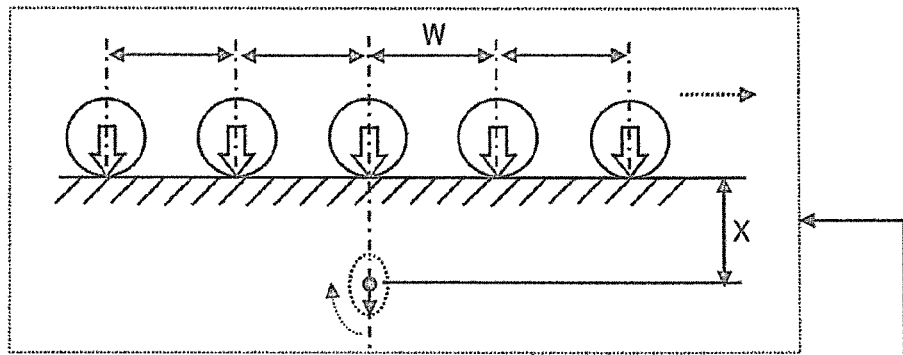
(a)
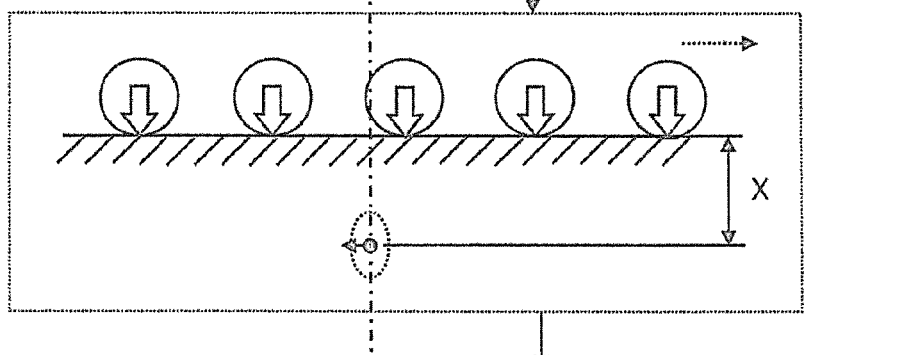
(b)
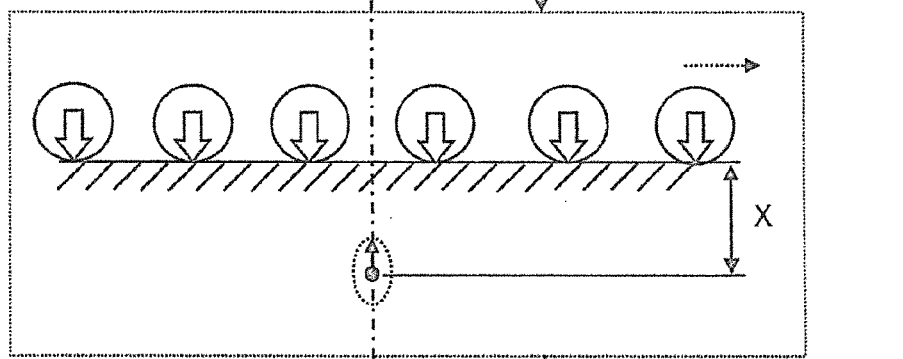
(c)
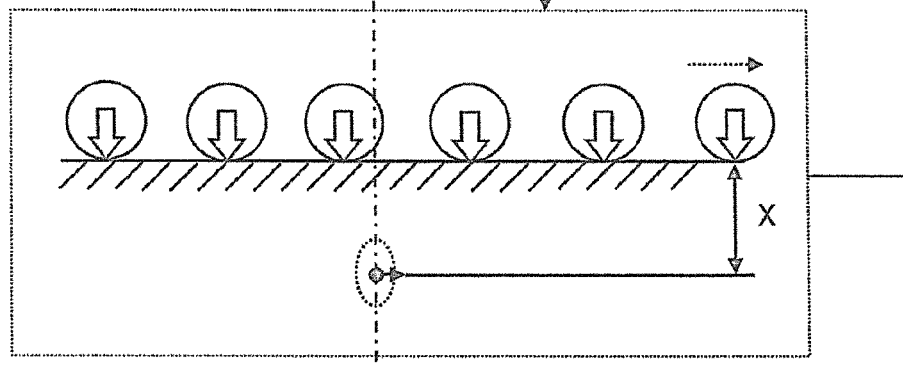
(d)

Fig.16
(a)
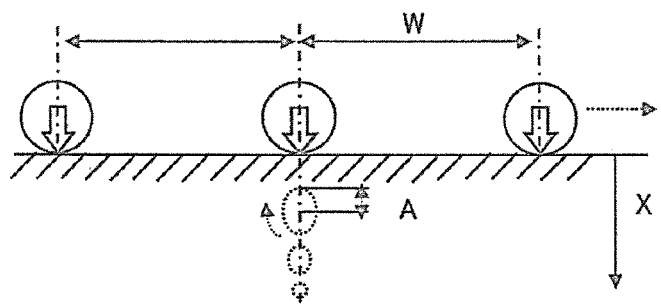
(b)
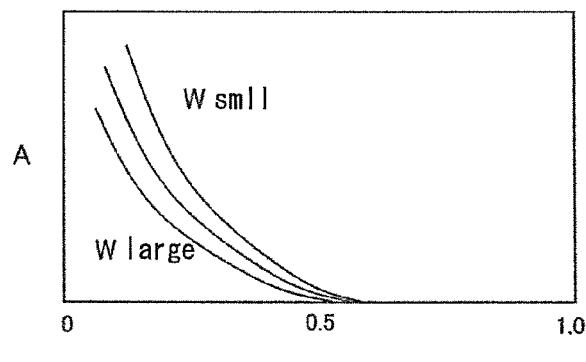
(c)
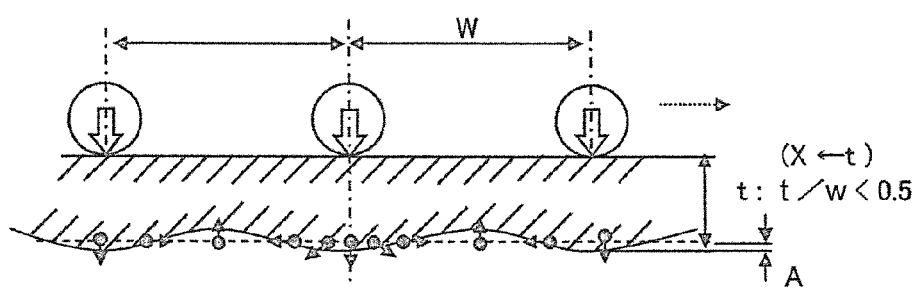
(d)
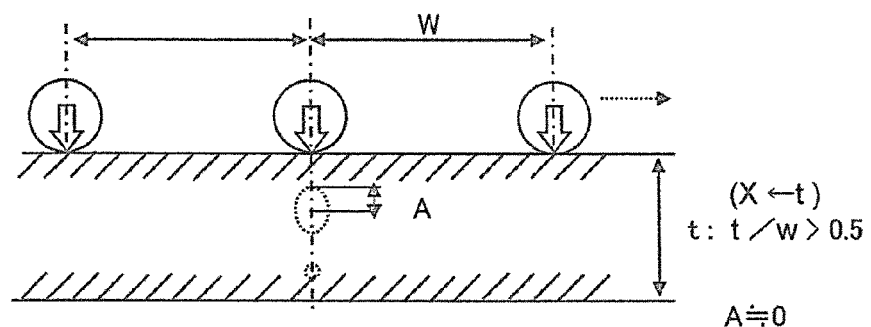

Fig.17
(a)
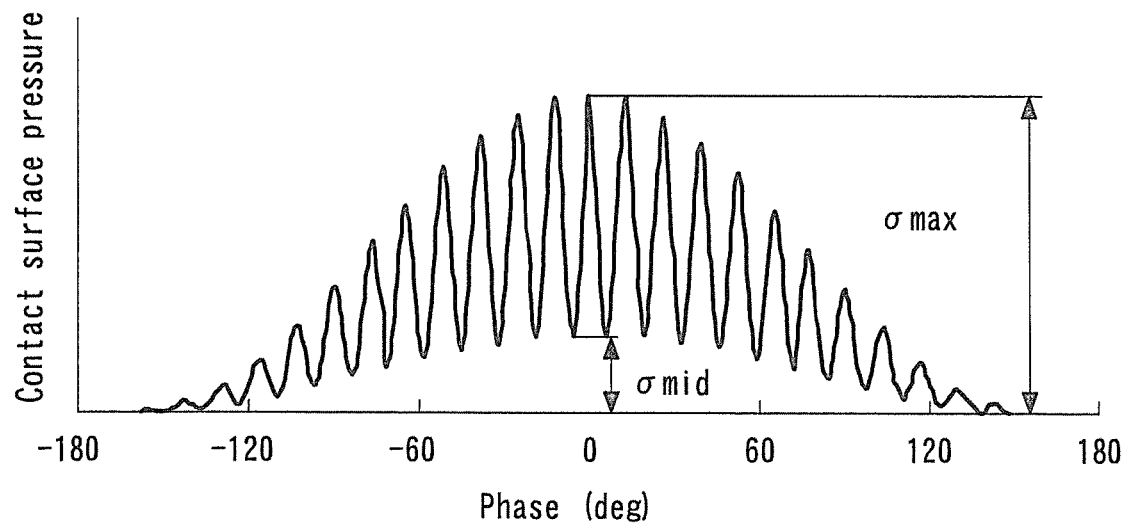
(b)
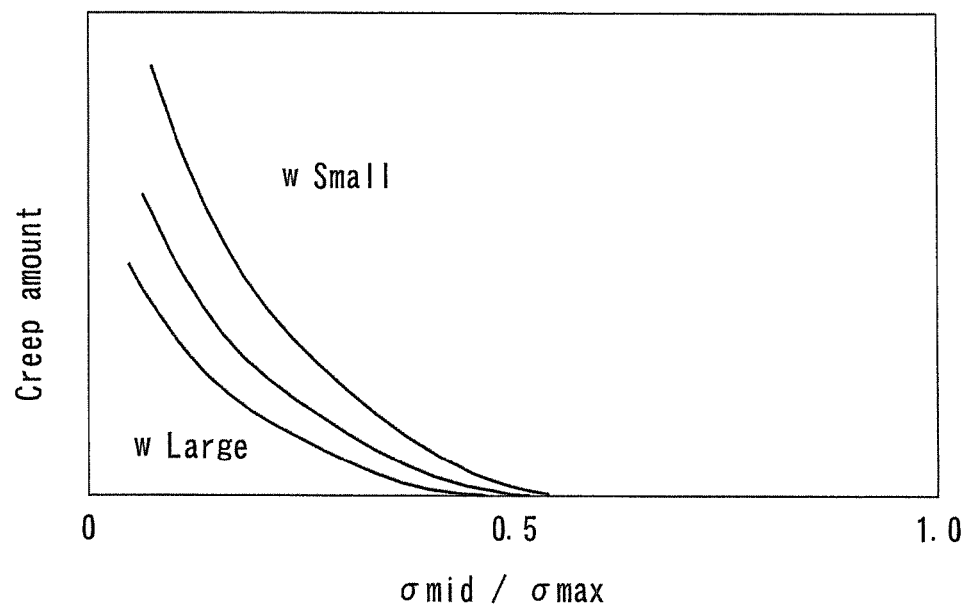

ROLLING BEARING

TECHNICAL FIELD

This invention relates to a rolling bearing used in transportation machinery and various other kinds of industrial machinery.

BACKGROUND ART

Rolling bearings are used in transportation machinery and various other industrial machines to support their various parts so as to be rotatable relative to each other. A rolling bearing includes an outer race formed with a raceway, an inner race formed with a raceway, and rolling elements disposed between the raceways of the inner and outer races, supporting the inner and outer races so as to be rotatable about the axis of the bearing.

The inner race has a bore through which a shaft can be inserted so as to be fixed to the inner race. The outer race can be fixedly fitted in a housing.

Typically, the outer race 1 and the housing H, as well as the inner race 2 and the shaft Ax, are fitted together by clearance fit or interference fit such the outer race and the housing, as well as the inner race and the shaft, do not rotate relative to each other.

In large motor vehicles such as heavyweight dump trucks, tapered roller bearings as shown in FIGS. 19 and 20 are frequently used (see e.g. JP Patent Publication 2009-204016A) because tapered roller bearings are large in load capacity and high in rigidity.

In a rolling bearing used in such a heavyweight vehicle, the outer race 1 and the housing H, and/or the inner race 2 and the shaft Ax may creep, i.e. slightly rotate relative to each other about the bearing axis, when the rolling elements 3 move and the load distribution changes.

Such creeping occurs e.g. when fitting surface pressures from the rolling elements 3 to the inner and outer races change as the rolling bearing 10 rotates, thus causing arbitrary and random deformation of the inner and outer races.

For example, the portions of the outer and inner races 1 and 2 that are in contact with a rolling element 3 located right under the axis of the rolling bearing 10 tend to be deformed in the circumferential direction more markedly than the other portions of the inner and outer races. The further this rolling element 3 moves circumferentially from the position right under the bearing axis, the lower the degree of deformation of the portions of the inner and outer races that are in contact with this rolling element 3. Thus, any portion of each of the inner and outer races is deformed alternately to a larger degree and a smaller degree, so that as a whole, the outer and inner races 1 and 2 are deformed in a wavy pattern in the circumferential direction. This causes creeping between the outer race 1 and the housing H and between the inner race 2 and the shaft Ax. The higher the radial load applied to the rolling bearing 10, the higher this tendency.

If creeping occurs, the contact portions between the outer race 1 and the housing H and between the inner race 2 and the shaft Ax tend to become worn, producing noise and vibration, or causing seizure on the contact surfaces.

JP Patent Publication 2001-1710A proposes an arrangement for reducing creeping, in which in order to reduce creeping between the inner race of a bearing and a hub ring fitted in the inner race, an end of the hub ring is crimped such that a material forming the hub ring is received in grooves formed in the inner periphery of the inner race at its end, thereby rotationally fixing together the hub ring and the inner race.

JP Patent Publication 2010-25155A proposes to manufacture a bearing by an ordinary method, but such that in order to reduce creeping, the inner and outer races both have larger wall thicknesses and thus are more rigid than conventional inner and outer races.

By increasing the wall thicknesses of the inner and outer bearing races, it is necessary to reduce the roller diameter if the number of the rollers is unchanged. This reduces the load rating of the bearing because the load rating is an increasing function of the roller diameter as well as of the number of the rollers. But in JP Patent Publication 2010-25155A, it is stated that even when the wall thicknesses of the inner and outer bearing races are increased, it is possible to increase the load rating by increasing the number of the rollers even though the roller diameter has to be reduced.

Press release "Developing creep-free bearings" (Public Relations Department, NSK Ltd., Jun. 27, 2007; http:jp.nsk.com/company/presslounge/news/2007/press070627.html) proposes, in order to minimize creeping, to optimize the dimensions of an O-ring and a groove formed in the radially outer surface of the outer race in which the O-ring is received, as well as the elasticity and repulsive force of the O-ring.

In NSK TECHNICAL JOURNAL No. 680 (2006) pages 13 to 18 "Mechanism of creeping of bearing outer race", the results of experiments and numerical analyses are reported regarding creeping of the stationary bearing ring of a bearing in the same direction as the rotational direction of the bearing.

In this document, regarding issues related to the amount of creeping, it is reported that the smaller the ratio of the outer race wall thickness to the rolling element diameter, the higher the creep tendency and that the higher the load ratio (Fr/Cr), the higher the creep tendency too. It is further mentioned that the smaller the number of the rollers, the higher the creep tendency.

In NSK TECHNICAL JOURNAL No. 680 (2006) pages 13 to 18 "Mechanism of creeping of bearing outer race", the mechanism of creeping is explained as circumferential stretching and shrinkage of the bearing rings, i.e. as the behavior of longitudinal waves. Finite element method (FEM) analysis regarding the amount of creeping is performed by simple two-dimensional calculation.

While the arrangements disclosed in JP Patent Publication 2009-204016A; JP Patent Publication 2001-1710A; JP Patent Publication 2010-25155A and Press release "Developing creep-free bearings" (Public Relations Department, NSK Ltd., Jun. 27, 2007; http:jp.nsk.com/company/presslounge/news/2007/press070627.html) are effective to reduce creeping to some extent under certain conditions, but may not be effective to reduce creeping of bearings to which large radial loads are applied.

In NSK TECHNICAL JOURNAL No. 680 (2006) pages 13 to 18 "Mechanism of creeping of bearing outer race", a technique concerning certain tendencies regarding creeping is described. But data showing these relations are nothing but qualitative description showing the relationship between relative ratios. Thus, this reference discloses none of inflexion points of a graph related to creeping and clear reference values concerning creeping.

SUMMARY OF THE INVENTION

An object of the present invention is to reduce creeping in a rolling bearing to which large radial loads are applied.

In order to achieve this object, the present invention provides a rolling bearing comprising an outer race having a raceway, an inner race having a raceway, and rolling elements disposed between the raceways of the outer race and the inner race, wherein the inner race is formed with a bore through which a shaft can be fitted, characterized in that the bearing is designed and configured such that with the shaft fitted through the bore of the inner race, when a bearing load is applied between the outer race and the shaft and due to the bearing load, a peak load is applied to the inner race from one of the rolling elements which receives a largest portion of the bearing load among the rolling elements, a circumferential surface pressure distribution generated on the inner race by the one of the rolling elements circumferentially overlaps with each of circumferential surface pressure distributions generated on the inner race by respective rolling elements circumferentially adjacent to the one of the rolling elements, wherein the bearing is further designed and configured to satisfy the relation:

$$t/w > 0.5$$

where t is a minimum thickness of a portion of the inner race where the rolling elements contact the raceway of the inner race, in a direction perpendicular to the raceway of the inner race; and $$w = \pi \times SD/Z$$

where Z is the number of the rolling elements; and
SD is an inner diameter of the bearing.

As another arrangement, the present invention provides a rolling bearing comprising an outer race having a raceway, an inner race having a raceway, and rolling elements disposed between the raceways of the outer race and the inner race, wherein the inner race is formed with a bore through which a shaft can be fitted, characterized in that the bearing is designed and configured such that with the shaft fitted through the bore of the inner race, when a bearing load is applied between the outer race and the shaft and due to the bearing load, a peak load is applied to the inner race from one of the rolling elements which receives a largest portion of the bearing load among the rolling elements, a circumferential surface pressure distribution generated on the inner race by the one of the rolling elements circumferentially overlaps with each of circumferential surface pressure distributions generated on the inner race by respective rolling elements circumferentially adjacent to the one of the rolling elements, wherein the bearing is further designed and configured to satisfy the relation:

$$\sigma_{mid} > \sigma_{max}/2$$

where $\sigma_{mid}$ and $\sigma_{max}$ are minimum and maximum values, respectively, of a combined circumferential surface pressure distribution which is a combination of the circumferential surface pressure distributions generated by the one of the rolling elements and the rolling elements circumferentially adjacent to the one of the rolling elements.

As still another arrangement, the present invention provides a rolling bearing comprising an outer race having a raceway, an inner race having a raceway, and rolling elements disposed between the raceways of the outer race and the inner race, wherein the inner race is formed with a bore through which a shaft can be fitted, characterized in that the bearing is designed and configured such that with the shaft fitted through the bore of the inner race, when a bearing load is applied between the outer race and the shaft and due to the bearing load, a peak load P is applied to the inner race from one of the rolling elements which receives a largest portion of the bearing load among the rolling elements, a first circumferential surface pressure distribution generated on the inner race by the one of the rolling elements circumferentially overlaps with each of second circumferential surface pressure distributions generated on the inner race by respective rolling elements circumferentially adjacent to the one of the rolling elements, wherein the bearing is further designed and configured to satisfy the relation:

$$\sigma_1/4 < \sigma_2$$

where $\sigma_2$ is a surface pressure value applied to the inner race from the one of the rolling elements at a crossing point where a curve representing the first circumferential surface pressure distribution crosses a curve representing each of the second circumferential surface pressure distributions; and $\sigma_1$ is the maximum value of the first circumferential surface pressure distribution, and wherein of and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the inner race (2) where the rolling elements (3) contact the raceway (2a) of the inner race (2), in a direction perpendicular to the raceway (2a) of the inner race;

$$q = P/L;$$

and $$s = \pi \times SD/(2Z)$$

where L is an axial effective contact length between the one of the rolling elements (3) and the raceway (2a) of the inner race (2);
Z is the number of the rolling elements (3); and
SD is an inner diameter of the bearing.

These arrangements will now be further described. When a radial load is applied to a bearing, loads act on the raceway of the inner race from the respective rolling elements, which are arranged in the circumferential direction. Thus, fitting surface pressures are applied to the inner race from the respective rolling elements.

The surface pressure generated on the inner race by the peak load from one of the rolling elements to which the largest load is applied is the highest at the circumferential center point of the contact area between the one rolling element and the inner race (hereinafter referred to as the "peak point"). This highest surface pressure is indicated by $\sigma_1$. The surface pressure gradually and circumferentially decreases from the peak position. The fitting surface pressures generated by the peak loads from the rolling elements adjacent to the one rolling element are also distributed in the similar manner.

Since the surface pressure distribution generated on the inner race by the one rolling element circumferentially overlaps with the surface pressure distributions generated on the inner race by the rolling elements adjacent to the one rolling element, it is possible to minimize fluctuations of the combined surface pressure distribution in the circumferential direction.

As a first means for minimizing fluctuations of the circumferential surface pressure distribution, the bearing is designed and configured to satisfy the relation:

$$t/w > 0.5$$

where t is a minimum thickness of a portion of the inner race where the rolling elements contact the raceway of the inner race, in a direction perpendicular to the raceway of the inner race; and $$w = \pi \times SD/Z$$

where Z is the number of the rolling elements (3); and SD is an inner diameter of the bearing. It was confirmed that this arrangement is effective to reduce creeping of the inner race relative to the axle.

As a second alternative means, the bearing is designed and configured to satisfy the relation:

$$\sigma mid > \sigma max/2$$

where σmid and σmax are minimum and maximum values (at the trough and peak positions), respectively, of a combined circumferential surface pressure distribution which is a combination of the circumferential surface pressure distributions generated on the inner race by the one of the rolling elements and the rolling elements circumferentially adjacent to the one of the rolling elements. It was confirmed that this arrangement is also effective to reduce creeping of the inner race relative to the shaft.

As a third alternative means, the bearing is designed and configured to satisfy the relation:

$$\sigma_1/4 < \sigma_2$$

where $\sigma_2$ is a surface pressure value applied to the inner race from the one of the rolling elements at a crossing point where a curve representing the first circumferential surface pressure distribution crosses a curve representing each of the second circumferential surface pressure distributions; and $\sigma_1$ is the maximum value of the first circumferential surface pressure distribution. It was confirmed that this arrangement is also effective to reduce creeping.

That is, by controlling one of the ratio of the wall thickness t of the inner race to the distance w between adjacent rolling elements, the ratio of the minimum value timid to the maximum value σmax, of the surface pressure distribution, and the ratio of the surface pressure value $\sigma_2$ at the crossing point to the peak surface pressure value $\sigma_1$ such that this ratio is not lower than a predetermined value, it is possible to minimize fluctuations of the surface pressure distribution in the circumferential direction. This in turn reduces a difference in the degree of deformation of the inner race according to its position (i.e. between its position corresponding to the rolling element located right under the axis of the bearing and a rolling element displaced circumferentially from right under the axis of the bearing). Any of these arrangements are therefore effective to reduce creeping in a rolling bearing which is subjected to large radial loads.

How creeping decreases can be determined by FEM analysis. In this analysis, bearings are created virtually and are different from each other in the ratio of the wall thickness t of the inner race to the distance w between adjacent rolling elements, the ratio of the minimum value σmid to the maximum value σmax, of the surface pressure distribution, and/or the ratio of the surface pressure value $\sigma_2$ at the crossing point to the peak surface pressure value $\sigma_1$. The amount of creeping for each of the above bearings was calculated by FEM analysis using the peak load P applied to the inner race from the rolling element to which the largest load is applied. The peak load can be calculated by the method of e.g. Jones or Harris.

In order to improve one of the ratio of the wall thickness t of the inner race to the distance w between adjacent rolling elements, the ratio of the minimum value σmid to the maximum value σmax, of the surface pressure distribution, and the ratio of the surface pressure value $\sigma_2$ at the crossing point to the peak surface pressure value $\sigma_1$, it is possible e.g. to reduce the distances between the circumferentially adjacent rolling elements. While it is impossible to indefinitely reduce these distances, it is possible to reduce these distances by reducing the diameter of the rolling elements.

Obviously, none of the ratio of the wall thickness t of the inner race to the distance w between adjacent rolling elements, the ratio of the minimum value σmid to the maximum value σmax, of the surface pressure distribution, and the ratio of the surface pressure value $\sigma_2$ at the crossing point to the peak surface pressure value of exceeds one. Especially regarding the relationship between the surface pressure value $\sigma_2$ at the crossing point to the peak surface pressure value $\sigma_1$, if the ratio of the surface pressure value $\sigma_2$ at the crossing point to the peak surface pressure value $\sigma_1$ is 0.5, the peak surface pressure value is equal to the surface pressure value of the combined surface pressure distribution at the crossing point. Thus, by determining the above ratio at 0.5, it is possible to minimize fluctuations of the combined surface pressure distribution in the circumferential direction.

But in an attempt to improve the ratio of the wall thickness t of the inner race to the distance w between adjacent rolling elements, the ratio of the minimum value σmid to the maximum value σmax, of the surface pressure distribution, or the ratio of the surface pressure value $\sigma_2$ at the crossing point to the peak surface pressure value $\sigma_1$, if the circumferential distances between the adjacent rolling elements are made too short, the distances between the circumferentially adjacent pockets in which the respective rolling elements are received tend to be too short. This could lead to a problem regarding strength of the retainer according to its material or shape. Thus, the circumferential distances between the adjacent rolling elements should be determined taking into consideration the influence of the above distances on the strength of the retainer in conjunction with the material or shape of the retainer.

A bearing having any of the above-mentioned configurations may be of the type in which the inner race and the shaft are kept stationary and the outer race is configured to be rotated, and in which the shaft is fitted through the inner race with a clearance fit.

When a radial load is applied to such a rolling bearing, since the outer race is ordinarily more likely to creep than the inner race, the inner race is frequently fitted with a clearance fit while the outer race is fitted with an interference fit. But if an especially large radial load is applied to the bearing, the inner race may also creep under certain conditions. Thus, the above arrangement is effective if the bearing is configured such that the inner race is stationary, the outer race is rotated, and the shaft is fitted in the inner race with a clearance fit.

The above arrangement can be used not only to reduce creeping between the inner race and the shaft but also between the outer race and the housing.

That is, in a similar way as with the inner race and the shaft, as a first means, in a rolling bearing comprising an outer race having a raceway, an inner race having a raceway, and rolling elements disposed between the raceways of the outer race and the inner race, in which the outer race can be fitted in a housing, the bearing is designed and configured such that with the outer race fitted in the housing, when a bearing load is applied between the inner race and the housing and due to the bearing load, a peak load is applied to the outer race from one of the rolling elements which receives a largest portion of the bearing load among the rolling elements, a circumferential surface pressure distribution generated on the outer race by the one of the rolling elements circumferentially overlaps with each of circumferential surface pressure distributions generated on the outer race by respective rolling elements circumferentially adjacent to the one of the rolling elements, and the bearing is further designed and configured to satisfy the relation:

$$t/w>0.5$$

where t is a minimum thickness of a portion of the outer race (2) where the rolling elements contact the raceway of the outer race, in a direction perpendicular to the raceway of the outer race; and $$w=\pi \times LD/Z$$

where Z is the number of the rolling elements; and
LD is an outer diameter of the bearing.

As a second alternative means, in a rolling bearing comprising an outer race having a raceway, an inner race having a raceway, and rolling elements disposed between the raceways of the outer race and the inner race, wherein the outer race can be fitted in a housing, the bearing is designed and configured such that with the outer race fitted in the housing, when a bearing load is applied between the inner race and the housing due to the bearing load, a peak load is applied to the outer race from one of the rolling elements which receives a largest portion of the bearing load among the rolling elements, a circumferential surface pressure distribution generated on the outer race by the one of the rolling elements circumferentially overlaps with each of circumferential surface pressure distributions generated on the outer race by respective rolling elements circumferentially adjacent to the one of the rolling elements, and the bearing is further designed and configured to satisfy the relation:

$$\sigma mid > \sigma max/2$$

where σmid and σmax are minimum and maximum values, respectively, of a combined circumferential surface pressure distribution which is a combination of the circumferential surface pressure distributions generated by the one of the rolling elements and the rolling elements circumferentially adjacent to the one of the rolling elements.

As a third alternative means, in a rolling bearing comprising an outer race having a raceway, an inner race having a raceway, and rolling elements disposed between the raceways of the outer race and the inner race, wherein the outer race can be fitted in a housing, the bearing is designed and configured such that with the outer race fitted in the housing, when a bearing load is applied between the inner race and the housing due to the bearing load, a peak load P is applied to the outer race from one of the rolling elements which receives a largest portion of the bearing load among the rolling elements, a first circumferential surface pressure distribution generated on the outer race by the one of the rolling elements circumferentially overlaps with each of second circumferential surface pressure distributions generated on the outer race by respective rolling elements circumferentially adjacent to the one of the rolling elements, and the bearing is further designed and configured to satisfy the relation:

$$\sigma_1/4 < \sigma_2$$

where $\sigma_2$ is a surface pressure value applied to the outer race from the one of the rolling elements at a crossing point where a curve representing the first circumferential surface pressure distribution crosses a curve representing each of the second circumferential surface pressure distributions; and $\sigma_1$ is the maximum value of the first circumferential surface pressure distribution, and in which $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the outer race where the rolling elements contact the raceway of the outer race, in a direction perpendicular to the raceway of the outer race;

$$q=P/L;$$

and $$s=\pi \times LD/(2Z)$$

where L is an axial effective contact length between the one of the rolling elements and the raceway of the outer race;
Z is the number of the rolling elements; and
LD is an outer diameter of the bearing.

These arrangements are further described for when these arrangements are used to reduce creeping between the outer race and the housing instead of reducing creeping between the inner race and the shaft. When a radial load is applied to the bearing, loads act on the raceway of the outer race from the respective rolling elements, which are arranged in the circumferential direction. Thus, fitting surface pressures are applied to the outer race from the respective rolling elements.

The surface pressure generated on the outer race by the peak load from one of the rolling elements to which the largest load is applied is the highest at the circumferential center point of the contact area between the one rolling element and the outer race (hereinafter referred to as the "peak point"). This highest surface pressure is indicated by $\sigma_1$. The surface pressure gradually and circumferentially decreases from the peak position. The fitting surface pressures generated by the peak loads from the rolling elements adjacent to the one rolling element are also distributed in the similar manner.

Since the surface pressure distribution generated on the outer race by the one rolling element circumferentially overlaps with the surface pressure distributions generated on the inner race by the rolling elements adjacent to the one rolling element, it is possible to minimize fluctuations of the combined surface pressure distribution in the circumferential direction.

As a first means for minimizing fluctuations of the circumferential surface pressure distribution, the bearing is designed and configured to satisfy the relation:

$$t/w>0.5$$

where t is a minimum thickness of a portion of the outer race where the rolling elements contact the raceway of the outer race, in a direction perpendicular to the raceway of the outer race; and $$w=\pi \times LD/Z$$

where Z is the number of the rolling elements (3); and
LD is an outer diameter of the bearing. It was confirmed that this arrangement is effective to reduce creeping of the outer race relative to the housing.

As a second alternative means, the bearing is designed and configured to satisfy the relation:

$$\sigma mid > \sigma max/2$$

where σmid and σmax are minimum and maximum values (at the trough and peak positions), respectively, of a combined circumferential surface pressure distribution which is a combination of the circumferential surface pressure distributions generated on the outer race by the one of the rolling elements and the rolling elements circumferentially adjacent to the one of the rolling elements. It was confirmed that this arrangement is also effective to reduce creeping of the outer race relative to the housing.

As a third alternative means, the bearing is designed and configured to satisfy the relation:

$$\sigma_1/4 < \sigma_2$$

where $\sigma_2$ is a surface pressure value applied to the outer race from the one of the rolling elements at a crossing point where a curve representing the first circumferential surface pressure distribution crosses a curve representing each of the second circumferential surface pressure distributions; and $\sigma_1$ is the maximum value of the first circumferential surface pressure distribution. It was confirmed that this arrangement is also effective to reduce creeping.

That is, by controlling one of the ratio of the wall thickness t of the outer race to the distance w between adjacent rolling elements, the ratio of the minimum value σmid to the maximum value σmax, of the surface pressure distribution, and the ratio of the surface pressure value $\sigma_2$ at the crossing point to the peak surface pressure value $\sigma_1$ such that this ratio is higher than a predetermined value, it is possible to minimize fluctuations of the surface pressure distribution in the circumferential direction. This in turn reduces a difference in the degree of deformation of the outer race according to its position (i.e. between its position corresponding to the rolling bearing located right under the axis of the bearing and a rolling element displaced circumferentially from right under the axis of the bearing). Any of these arrangements are therefore effective to reduce creeping in a rolling bearing which is subjected to large radial loads.

How creeping decreases can be determined by FEM analysis. in the same manner as with the creeping between the inner race and the shaft.

In order to improve one of the ratio of the wall thickness t of the outer race to the distance w between adjacent rolling elements, the ratio of the minimum value σmid to the maximum value σmax, of the surface pressure distribution, and the ratio of the surface pressure value $\sigma_2$ at the crossing point to the peak surface pressure value $\sigma_1$, in the same manner as the corresponding ratio regarding the inner race and the shaft, it is possible e.g. to reduce the distances between the circumferentially adjacent rolling elements. It is possible to reduce these distances by reducing the diameter of the rolling elements.

A bearing having any of the above-mentioned configurations may be of the type in which the inner race is rotated, and the outer race and the housing are kept stationary, with the outer race fitted in the housing with a clearance fit.

When a radial load is applied to such a rolling bearing, since the inner race is ordinarily more likely to creep than the outer race, the inner race is frequently fitted with an interference fit while the outer race is fitted with a clearance fit. But if an especially large radial load is applied to the bearing, the outer race may also creep under certain conditions. Thus, the above arrangement is effective if the bearing is configured such that the inner race is rotated, the outer race is stationary, and the outer race is fitted in the housing with a clearance fit.

The peak loads P used in this method are e.g. calculated based on the below equation:

$$P = 4.08 \times P_0/(Z \times \cos \alpha)$$

where $P_0$ is a radial load applied to the bearing, and α is the contact angle between each rolling element and one of the raceways of the inner and outer races on which the surface pressure distributions overlap with each other, measured at the axially central position of the contact area between the rolling element and the one of the raceways.

The radial load $P_0$ used in the above equations may be calculated based on the equation:

$$P_0 = Cor \times 1/S_0$$

where Cor is a basic static radial load rating, and $S_0$ is a safety factor of the bearing for the basic static radial load rating ($S_0 > 1$).

The safety factor $S_0$ is determined suitably according to the type, configuration and intended use of the bearing. For example, if the bearing is mounted on an axle of a super-large transportation machine which is used harsh conditions, the safety factor $S_0$ may be determined at 1/0.35. By using any of the configurations in such a bearing used under harsh conditions, it is possible to especially effectively reduce creeping.

In any of the above arrangements, the rolling bearing may be a ball bearing, of which the rolling elements are balls.

If a ball bearing is used, the wall thickness t as used in the above calculation is the minimum thickness t of the bearing race at its oval contact area where each ball contacts the raceway generated due to elastic deformation of the ball and the raceway, in the direction perpendicular to the raceway. The axial effective contact length L between the rolling element and the raceway is the length of the oval contact area in the axial direction of the bearing.

Thus, if the bearing is a deep groove ball bearing, the above wall thickness t is the radial thickness of the bearing at the deepest point of the raceway. If the bearing is an angular ball bearing, of which the rolling elements contact the raceways with a contact angle, the wall thickness t is the minimum thickness of each bearing race at the oval contact area between each rolling element and the raceway, in the direction perpendicular to the raceway.

The contact angle α is zero if the bearing is a deep groove ball bearing, and if the bearing is an angular ball bearing, the contact angle α is the contact angle at the at the axial center of the contact area.

In any of these arrangements, the roller bearing may be a roller bearing, of which the rolling elements are rollers.

If a roller bearing is used, it is preferably a tapered roller bearing, of which the rolling elements are tapered rollers. The inner and outer races of a tapered roller bearing are designed such that the distance between the raceways of the inner and outer races decreases in one axial direction of the bearing, and a preload is applied to the respective tapered rollers by pressing the inner race relative to the outer race in the one axial direction.

If such a preload is applied to the respective rolling elements of a bearing when assembling the bearing, it is necessary to take this preload into consideration in calculating the minimum and maximum values σmid and σmax of the surface pressure distribution, or a ratio between the surface pressure value $\sigma_2$ at the crossing point and the peak surface pressure $\sigma_1$.

In order to reduce creeping between the inner race and the shaft, the rolling bearing may be designed in the following manner.

In particular, the present invention provides a method of designing a rolling bearing comprising an outer race having a raceway, an inner race having a raceway, and rolling elements disposed between the raceways of the outer race and the inner race, wherein the inner race is formed with a bore through which a shaft can be fitted, characterized in that the bearing is designed such that with the shaft fitted through the bore of the inner race, when a bearing load is applied between the outer race and the shaft and due to the bearing load, a peak load is applied to the inner race from one of the rolling elements which receives a largest portion of the bearing load among the rolling elements, a circumferential surface pressure distribution generated on the inner race by one of the rolling elements circumferentially overlaps with each of circumferential surface pressure distributions generated on the inner race by respective rolling elements circumferentially adjacent to the one of the rolling elements, wherein the bearing is further designed to satisfy the relation:

$$\sigma\text{mid} > \sigma\text{max}/2$$

where σmid and σmax are minimum and maximum values, respectively, of a combined circumferential surface pressure distribution which is a combination of the circumferential surface pressure distributions generated by the one of the rolling elements and the rolling elements circumferentially adjacent to the one of the rolling elements.

Alternatively, the present invention provides a method of designing a rolling bearing comprising an outer race having a raceway, an inner race having a raceway, and rolling elements disposed between the raceways of the outer race and the inner race, wherein the inner race is formed with a bore through which a shaft can be fitted, characterized in that the bearing is designed such that with the shaft fitted through the bore of the inner race, when a bearing load is applied between the outer race and the shaft and due to the bearing load, a peak load P is applied to the inner race from one of the rolling elements which receives a largest portion of the bearing load among the rolling elements, a first circumferential surface pressure distribution generated on the inner race by the one of the rolling elements circumferentially overlaps with each of second circumferential surface pressure distributions generated on the inner race by respective rolling elements circumferentially adjacent to the one of the rolling elements, wherein the bearing is further designed to satisfy the relation:

$$\sigma_1/4 < \sigma_2$$

where $\sigma_2$ is a surface pressure value applied to the inner race from the one of the rolling elements at a crossing point where a curve representing the first circumferential surface pressure distribution crosses a curve representing each of the second circumferential surface pressure distributions; and
$\sigma_1$ is the maximum value of the first circumferential surface pressure distribution, and
wherein $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the inner race (2) where the rolling elements contact the raceway of the inner race, in a direction perpendicular to the raceway of the inner race;

$$q = P/L;$$

and $$s = \pi \times SD/(2Z)$$

where L is an axial effective contact length between the one of the rolling elements and the raceway of the inner race;
Z is the number of the rolling elements; and
SD is an inner diameter of the bearing.

In either of the above methods, creeping which is expected to be generated between the inner race and the shaft when the peak load P is applied may be calculated by a finite element method (FEM) analysis, and the bearing is designed such that the creeping thus calculated is smaller than a predetermined value. The amount of creeping is preferably limited to one revolution or less during the lifecycle of the bearing.

In order to reduce creeping between the outer race and the housing, the rolling bearing may be designed in the following manner.

In particular, the present invention provides a method of designing a rolling bearing comprising an outer race having a raceway, an inner race having a raceway, and rolling elements disposed between the raceways of the outer race and the inner race, wherein the outer race can be fitted in a housing, characterized in that the bearing is designed such that with the outer race fitted in the housing, when a bearing load is applied between the inner race and the housing and due to the bearing load, a peak load is applied to the outer race from one of the rolling elements which receives a largest portion of the bearing load among the rolling elements, a circumferential surface pressure distribution generated on the outer race by the one of the rolling elements circumferentially overlaps with each of circumferential surface pressure distributions generated on the outer race by respective rolling elements circumferentially adjacent to the one of the rolling elements, wherein the bearing is further designed to satisfy the relation:

$$\sigma\text{mid} > \sigma\text{max}/2$$

where σmid and σmax are minimum and maximum values, respectively, of a combined circumferential surface pressure distribution which is a combination of the circumferential surface pressure distributions generated by the one of the rolling elements and the rolling elements circumferentially adjacent to the one of the rolling elements.

Alternatively, the present invention provides a method of designing a rolling bearing comprising an outer race having a raceway, an inner race having a raceway, and rolling elements disposed between the raceways of the outer race and the inner race, wherein the outer race can be fitted in a housing, characterized in that the bearing is designed such that with the outer race fitted in the housing, when a bearing load is applied between the inner race and the housing and due to the bearing load, a peak load P is applied to the outer race from one of the rolling elements which receives a largest portion of the bearing load among the rolling elements, a first circumferential surface pressure distribution generated on the outer race by the one of the rolling elements circumferentially overlaps with each of second circumferential surface pressure distributions generated on the outer race by respective rolling elements circumferentially adjacent to the one of the rolling elements, wherein the bearing is further designed to satisfy the relation:

$$\sigma_1/4 < \sigma_2$$

where $\sigma_2$ is a surface pressure value applied to the outer race from the one of the rolling elements at a crossing point where a curve representing the first circumferential surface pressure distribution crosses a curve representing each of the second circumferential surface pressure distributions; and
$\sigma_1$ is the maximum value of the first circumferential surface pressure distribution, and
wherein $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the outer race where the rolling elements contact the raceway of the outer race, in a direction perpendicular to the raceway of the outer race;

$$q = P/L;$$

and $$s = \pi \times LD/(2Z)$$

where L is an axial effective contact length between the one of the rolling elements and the raceway of the outer race;
Z is the number of the rolling elements; and
LD is an outer diameter of the bearing.

In either of the above methods, creeping which is expected to be generated between the outer race and the housing when the peak load P is applied may be calculated by FEM analysis, and the bearing is designed such that the creeping thus calculated is smaller than a predetermined value. The amount of creeping is preferably limited to one revolution or less during the lifecycle of the bearing.

By using any of the above methods, it is possible to minimize circumferential fluctuations of the surface pressure distribution, thereby minimizing fluctuations in deformation of the inner race or the outer race when the rolling elements are displaced in the circumferential direction. This makes it possible to effectively reduce creeping even if large radial loads are applied to the rolling bearing.

According to the present invention, by controlling one of the ratio of the wall thickness t of the inner race or the outer race to the distance w between adjacent rolling elements, the ratio of the minimum value timid to the maximum value $\sigma$max, of the surface pressure distribution, and the ratio of the surface pressure value $\sigma_2$ at the crossing point to the peak surface pressure value of such that this ratio is higher than a predetermined value, it is possible to minimize fluctuations of the surface pressure distribution in the circumferential direction. This in turn reduces a difference in the degree of deformation of the inner race or the outer race. The present invention is therefore effective to reduce creeping in a rolling bearing which is subjected to large radial loads.

BRIEF DESCRIPTION OF THE DRAWINGS

FIGS. 1(a) and 1(b) are an entire view and a partial enlarged view, respectively, of an embodiment of the present invention.

FIGS. 2(a) schematically shows a radial load applied to a rolling bearing of the embodiment of FIGS. 1(a) and 1(b); and FIG. 2(b) schematically shows peak loads P applied from rolling elements of the rolling bearing of FIG. 2(a) to its inner race.

FIGS. 5(a) and 5(b) are schematic sectional views of a bearing of which the inner race, outer race and rolling elements are configured and designed according to the present invention; and FIGS. 5(c) and 5(d) are schematic sectional views of a conventional bearing including an inner race, an outer race and rolling elements.

FIG. 6(a) is a sectional view of a bearing of which the inner race, outer race and rolling elements are configured and designed according to the present invention; and FIGS. 6(b) is a schematic sectional view of a conventional bearing including an inner race, outer race and rolling elements.

FIGS. 8(a) to 8(c) are reference views showing the mechanism of how creeping occurs.

FIGS. 13(a) and 13(b) schematically show surface pressure distributions generated on the inner races of rolling bearings of high-creep configuration mounted on a front wheel axle on the inboard and outboard sides, respectively.

FIGS. 14(a) and 14(b) schematically show surface pressure distributions generated on the inner races of rolling bearings of low-creep configuration mounted on a rear wheel axle on the inboard and outboard sides, respectively.

FIGS. 15(a) to 15(d) schematically show how an internal point on the inner race of a bearing moves.

FIGS. 16(a), 16(c) and 16(d) schematically show internal points on the inner race of a bearing; and FIG. 16(b) is a graph showing the relationship between the value X/W and the value A.

FIG. 17(a) is a graph showing contact surface pressure (surface pressure distribution); and FIG. 17(b) is a graph showing the relationship between the value $\sigma$mid/$\sigma$max and the creep amount.

DETAILED DESCRIPTION OF THE INVENTION

Figure 3:
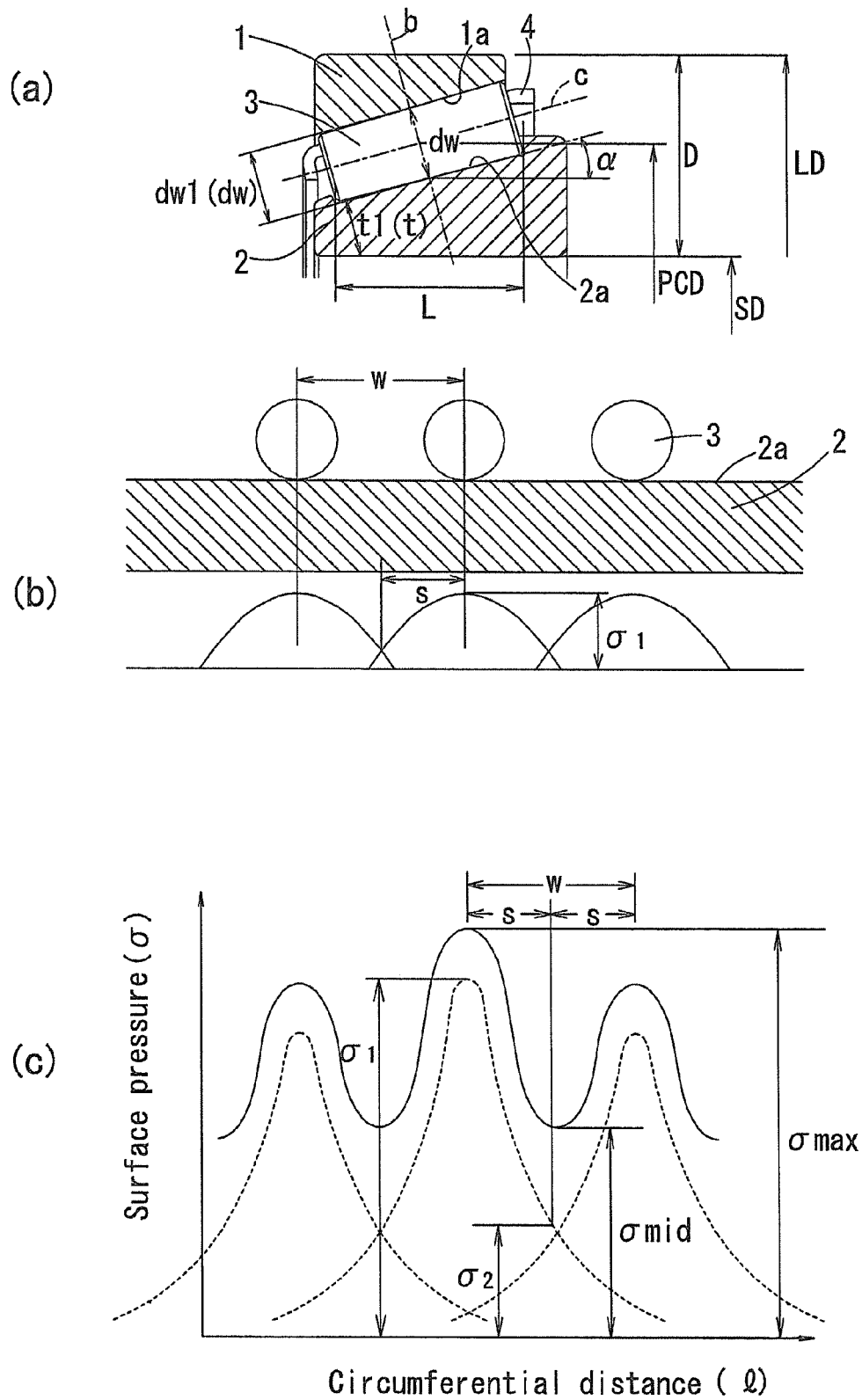
FIG. 3(a) is a schematic sectional view of a bearing of which the outer race, the inner race and the rolling elements are designed and configured according to the present invention.
FIG. 3(b) is a graph showing surface pressure distributions generated on the inner race by respective rolling elements.
FIG. 3(c) is a graph showing the surface pressure distributions shown in FIG. 3(b) as well as a combined surface pressure distribution which is a combination of the surface pressure distributions shown in FIG. 3(b).

The embodiment of the invention is now described with reference to FIGS. 1 to 4. This embodiment is directed to a wheel bearing assembly 20 used for an axle of a large motor vehicle such as a heavyweight dump truck, and including two rolling bearings 10. This embodiment is also directed to a method of designing the rolling bearings 10.

A large motor vehicle such as a heavyweight dump truck includes a chassis supporting the vehicle body and the carriage, axles Ax at the front and rear portions of the chassis, and wheels rotatable about the respective axles Ax.

Rotation of a driving source is transmitted to the wheels through a power train to drive the vehicle.

As shown in FIG. 1, the rolling bearings 10 of the wheel bearing assembly 20 are disposed between each of the axles Ax and a housing H. One of the wheels is fixed to the housing H through a wheel member 7.

In the embodiment, the rolling bearings 10 are tapered roller bearings each including an outer race 1 formed with a raceway 1a, an inner race 2 formed with a raceway 2a, and a plurality of tapered rollers (rolling elements) 3 disposed between the raceways 1a and 2a so as to be arranged in the circumferential direction. The tapered rollers 3 are circumferentially spaced apart from each other by a retainer 4. The inner races 2 of the bearings 10 have bores through which the axle Ax extends so as to be fixed to the inner races 2.

In this embodiment, the inner races 2 of the rolling bearings 10 and the axle Ax are stationary, while the outer races 1 and the housing H are rotated. The inner races 2 and the axle Ax are fitted together by clearance fit, while the outer races 1 and the housing H are fitted together by interference fit.

The right-hand and left-hand sides in FIG. 1 correspond to the inboard side and outboard side of the vehicle, respectively. Each of the inner races 2 of the rolling bearings 10 on the inboard and outboard sides has its raceway 2a tapered so as to narrow toward the other bearing 10. The inner races 2 each have large-diameter and small-diameter flanges 2b and 2c at the large-diameter and small-diameter ends of the raceway 2a, respectively. The raceways 1a of the outer races 1 are also tapered in the same directions as the raceways 2a of the opposed inner races 2.

The radial distance between the raceways 2a and 1a of the inner and outer races 2 and 1 of each rolling bearing 10 decreases toward the other rolling bearing 10. The inner races 2 of the respective rolling bearings 10 are pressed, relative to the outer races 1, toward the other rolling bearings 10 by presser members 5 and 6 provided axially outwardly of the respective rolling bearings 10, to apply preloads to the tapered rollers 3.

The contact angle α, as well as the effective contact length L, between the tapered rollers 3 and the raceway 2a of the inner race 2, the diameter dw of the tapered rollers 3, etc. are ordinarily determined according to the performance expected for the wheel bearing assembly 20 and its specs.

In the embodiment, the two rolling bearings 10 are identical in shape and size to each other and are arranged to form mirror images of each other. But they may be different in shape and/or size from each other.

With the axle Ax fitted in the inner race 2 of each bearing, when a radial load $P_0$ is applied between the outer race 1 (housing H) and the axle Ax, a peak load P is applied to the inner race 2 from the one particular tapered roller 3 which receives the highest load.

FIG. 2(a) schematically shows how the radial load $P_0$ acts on the rolling bearing 10. FIG. 2(b) schematically shows how peak loads P are applied to the inner race 2 from the one tapered roller 3 which receives the highest load, i.e. the tapered roller 3 located right under the axis of the rolling bearing 10, and the two tapered rollers 3 adjacent to the one tapered roller 3, respectively.

The peak loads P applied from the respective tapered rollers 3 to the raceway 2a of the inner race 2 generate fitting surface pressures on the inner race 2.

The surface pressure generated on the inner race 2 by the peak load from the one tapered roller 3 is the highest at the circumferential center point of the contact area between the one tapered roller 3 and the inner race 2 (hereinafter referred to as the "peak point"). This highest surface pressure is indicated by $\sigma_1$. The surface pressure gradually and circumferentially decreases from the peak position. The fitting surface pressures generated by the peak loads from the tapered rollers 3 adjacent to the one tapered roller 3 are also distributed in the similar manner.

FIGS. 3(a), 3(b) and 3(c) schematically show surface pressure distributions generated by the peak loads P from the respective tapered rollers 3. FIG. 3(a) is a partial enlarged sectional view of the rolling bearing 10 taken along a plane containing the axis of the bearing 10. FIG. 3(b) schematically shows, for better understanding, the surface pressure distributions with the annular inner race 2 shown in a planar shape.

The circumferential surface pressure distribution generated on the inner race 2 by the peak load from the one tapered roller 3 circumferentially overlaps with the circumferential surface pressure distributions generated on the inner race 2 by the peak loads from the tapered rollers 3 circumferentially adjacent to the one tapered roller 3.

In FIG. 3(c), broken lines show the individual circumferential surface pressure distributions generated on the inner race 2 by the peak loads from the respective tapered rollers, and the solid line shows the combined circumferential surface pressure distribution as the combination of the individual circumferential surface pressure distributions.

The elements of the bearing, including the inner race 2, outer race 1 and tapered rollers 3, are designed and configured such that the maximum value σmax and the minimum value σmid of the combined circumferential surface pressure distribution shown in FIG. 3(c) satisfy the relation:

$$\sigma mid > \sigma max/2$$

By determining the above two values so as to satisfy the relation σmid>σmax/2, creeping of the inner race 2 relative to the axle Ax dramatically decreases compared to when σmid is equal to or smaller than σmax/2.

For example, with this arrangement, it is even possible to reduce creeping of the inner race to one revolution or less during the lifecycle of the bearing. One revolution during the lifecycle of the bearing is practically zero creeping.

The creeping refers to creeping between the inner race 2 and the axle Ax which was calculated by finite element method (FEM) analysis based on peak loads P applied to the inner race 2 from the rolling elements 3.

The peak loads P used in this method are e.g. calculated based on the below equation:

$$P = 4.08 \times P_0/(Z \times \cos \alpha)$$

where α is the contact angle between each rolling element 3 and the raceway 2a of the inner race 2 (see FIG. 3(a)). If the bearing is a ball bearing, the peak loads P may be calculated based on the equation:

$$P = 4.37 \times P_0/(Z \times \cos \alpha)$$

(as described in a reference titled "Rolling Bearing Analysis", 4th edition; published by WILEY INTERSCIENCE, written by Tedric A. Harris; Chapter 7 "DISTRIBUTION OF INTERNAL LOADING IN STATICALLY LOADED BEARING).

When analyzing creeping between the outer race 1 and the housing H, the contact angle between each rolling element 3 and the outer race 1 is used. The contact angle α used in the above equations is the contact angle between each rolling element 3 and one of the raceways 2a and 1a of the inner and outer races 2 and 1 on which the surface pressure distributions overlap with each other, measured at the axially central position of the contact area between the rolling element 3 and the one of the raceways 2a and 1a.

The radial load $P_0$ used in the above equations may be calculated based on the equation:

$$P_0 = Cor \times 1/S_0$$

where Cor is a basic static radial load rating, and $S_0$ is a safety factor of the bearing for the basic static radial load rating ($S_0 > 1$).

The basic static radial load rating Cor and the safety factor $S_0$ vary with the type, specs, intended use, etc. of the bearing. Below, description is made of a bearing of a wheel bearing assembly 20 used to support an axle of a dump truck for use in mines as a large construction machine, where the safety factor $S_0$ is set at 1/0.35.

For such a bearing, the minimum and maximum values σmid and σmax of the combined surface pressure distribution should satisfy the relation:

$$\sigma mid > \sigma max/2$$

Figure 4:
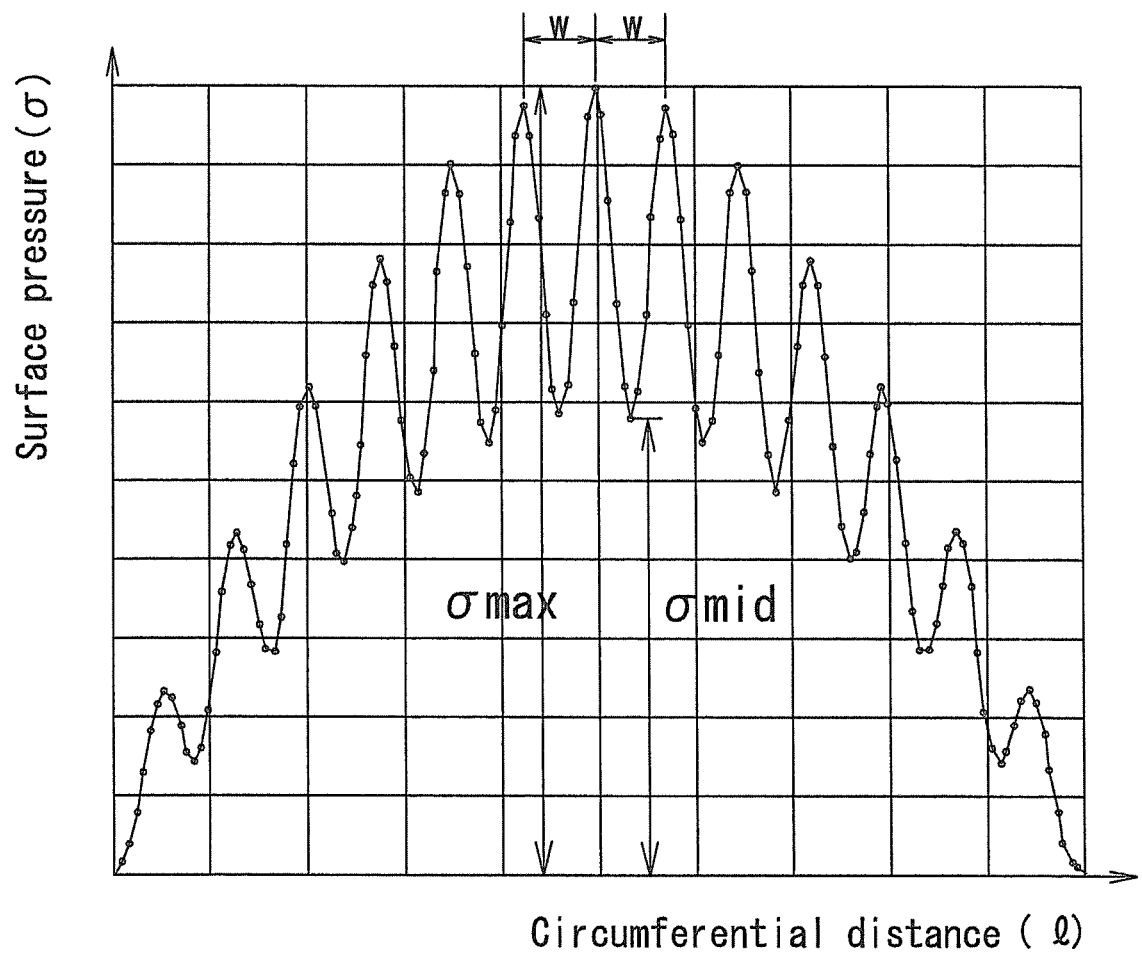
FIG. 4 is a graph showing a combined surface pressure distribution which is a combination of surface pressure distributions generated on the inner race of a bearing designed and configured according to the present invention by respective rolling elements of the bearing.

Thus, as shown in FIG. 4, these two values may be determined so as to satisfy the relation:

$$\sigma mid = \sigma max \times 6/10$$

By adjusting the minimum and maximum values σmid and σmax of the combined surface pressure distribution in the above manner, it is possible to use the above arrangement not only to reduce creeping between the inner race 2 and the axle Ax but also to reduce creeping between the outer race 1 and the housing H.

FIGS. 5 and 6 show another embodiment, of which FIGS. 5(*a*) and 5(*b*) schematically show surface pressure distributions generated by peak loads P applied from the respective tapered rollers 3. FIG. 5(*a*) is a partial enlarged sectional view of the rolling bearing 10 taken along a plane containing the axis of the bearing 10. FIG. 5(*b*) schematically shows, for better understanding, the surface pressure distributions with the annular inner race 2 shown in a planar shape, in the same manner as in FIG. 3(*b*).

The bearing is designed and configured such that the circumferential surface pressure distribution generated on the inner race 2 by the peak load from the above-mentioned one tapered roller 3 circumferentially overlaps with the circumferential surface pressure distributions generated on the inner race 2 by the peak loads from the respective tapered rollers 3 circumferentially adjacent to the one tapered roller 3.

As shown in FIG. 5(*b*), the bearing components, including the inner race 2, outer race 1 and tapered rollers 3, are further designed and configured to satisfy the relation:

$$\sigma_1/4 < \sigma_2$$

where $\sigma_2$ is the surface pressure value at the point (crossing point) where the surface pressure distribution curve corresponding to the one tapered roller crosses the surface pressure distribution curve corresponding to each of the tapered rollers 3 circumferentially adjacent to the one tapered roller 3, and $\sigma_1$ is the maximum value at the point (peak point) of the surface pressure distribution curve corresponding to the one tapered roller 3.

It was confirmed that creeping decreased dramatically by designing the bearing such that the relation $\sigma_1/4 < \sigma_2$ is met than when $\sigma_2$ is equal to or smaller than $\sigma_1/4$.

In conventional rolling bearings 10, as schematically shown in FIGS. 5(*c*) and 5(*d*), the circumferential surface pressure distribution generated on the inner race 2 by the above-mentioned one tapered roller 3 does not circumferentially overlap with either of the circumferential surface pressure distributions generated on the inner race 2 by the tapered rollers 3 circumferentially adjacent to the one tapered roller 3. Or even if they overlap with each other, the overlapping range is narrow. Thus, the combined surface pressure distribution (which is the combination of the surface pressure distributions generated by the respective tapered rollers) fluctuates markedly in the circumferential direction.

According to the present invention, by adjusting the surface pressure value at the crossing point $\sigma_2$ to ¼ or over the surface pressure value at the peak point $\sigma_1$, it is possible to minimize fluctuations of the combined surface pressure distribution in the circumferential direction. This in turn minimizes fluctuations in deformation of the inner race 2 when the tapered rollers 3 are displaced in the circumferential direction during rotation of the rolling bearing 10, thus making it possible to effectively reduce creeping even if large radial loads $P_0$ are applied to the rolling bearing.

The above arrangement, in which the ratio of the surface pressure value at the crossing point $\sigma_2$ to the surface pressure value at the peak point of is adjusted, can be used not only to minimize creeping between the inner race 2 and the axle Ax but also to minimize creeping between the outer race 1 and the housing H.

EXPERIMENT EXAMPLES

In order to confirm that the above arrangement is effective to reduce creeping of the rolling bearing 10, creeping was simulated using the FEM analysis.

The FEM analysis was conducted in two stages using either of the rolling bearings shown in FIGS. 6(*a*) and 6(*b*), respectively. First, loads on the individual rolling elements are calculated with the bearing under a predetermined load, using the Jones or Harris method (see e.g. Reference: ISO/TS16281: 2008(E) Rolling bearing-Methods for calculating the modified reference rating life for universally loaded bearings). Then, the FEM analysis is conducted keeping the loads on the individual rolling elements. The displacement of the inner race 2 obtained by the analysis is the expected amount of creeping of the inner race. Load conditions and loads on the respective rolling elements are shown in FIG. 2.

Based on stress formulas by Boussinesq (see e.g. Reference: Mechanics of Materials, Volume 2; published by YOKENDO; written by Ichiro Nakahara, Honorary Professor, Tokyo Institute of Technology; Chapter 6: Contact Stress), the above-mentioned fitting surface pressures $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is the minimum thickness of the portion of the inner race 2 where the rolling elements 3 contact the raceway 2*a*, in the direction perpendicular to the raceway 2*a*;

$$q = P/L;$$

and $$s = \pi < PCD/(2Z)$$

where L is the axial effective contact length between the rolling element 3 and the raceway 2*a*;
Z is the number of the rolling elements 3;
PCD is the pitch inner diameter of the bearing.

Since a preload is applied to the rolling elements 3 when they are assembled into the bearing, the surface pressure at the crossing point $\sigma_2$ and the surface pressure at the peak point of are calculated taking into consideration the preload.

The above value s may be calculated based on the inner diameter SD of the bearing (diameter of the bore formed in the inner race 2), instead of the pitch inner diameter PCD of the bearing, as follows:

$$s = \pi \times SD/(2Z)$$

If the rolling elements 3 are tapered rollers, the above-mentioned dimension t is the dimension shown by t1 in FIG. 5(*a*).

In the above analysis, creeping between the inner race 2 and the axle Ax is analyzed. In order to analyze creeping between the outer race 1 and the housing H, the above-mentioned thickness t and effective contact length L are replaced with the corresponding values regarding the outer race 1. In particular, the above-mentioned thickness t is replaced with the minimum thickness t of the portion of the outer race 1 where the rolling elements 3 contact the raceway 1*a* of the outer race, in the direction perpendicular to the raceway 1*a*. The above-mentioned length L is replaced with the axial effective contact length L between the rolling element 3 and the raceway 1*a* of the outer race 1.

The sectional height D of the rolling bearing 10 is the radial distance between the radially outer surface of the outer race 1 and the radially inner surface of the inner race 2. The diameter dw of the tapered rollers (rolling elements) is half the sum of the diameters of each tapered roller 3 at the large-diameter and small-diameter ends thereof, respectively.

The peak load P applied from the rolling element 3 to the inner race 2 is given by:

$$P = 4.08 \times P_0/(Z \times \cos \alpha)$$

where $\alpha$ is the contact angle between the rolling element 3 and the raceway 2*a* of the inner race 2 (see FIG. 5(*a*)).

When analyzing creeping between the outer race 1 and the housing H, the contact angle between the rolling element 3 and the raceway 1*a* of the outer race 1 is used. That is the contact angle $\alpha$ used in the above equation is the contact angle between the rolling element 3 and one of the raceways 2*a* and 1*a* of the inner race 2 and the outer race 1 on which surface pressure distributions circumferentially overlap with each other, at the axial center of the contact area therebetween.

The radial load $P_0$ applied to the bearing may also be calculated as follows:

$$P_0 = Cor \times 1/S_0$$

where Cor is the basic static radial load rating, and $S_0$ (>1) is the safety coefficient of the bearing.

The basic static radial load rating Cor and the safety coefficient $S_0$ are determined according to e.g. the type, specs and intended use of the bearing. In this particular case, the safety coefficient $S_0$ is determined at 1/0.35, on the assumption that the bearing is used in a wheel bearing assembly 20 supporting an axle of a dump truck for use in mines, as a large construction machine.

In this simulation, a bearing of a high-creep configuration was created, which is designed and configured as shown in FIGS. 5(*c*), 5(*d*) and 6(*b*). In this bearing, surface pressure distributions generated by any adjacent rolling elements 3 do not overlap with each other. A bearing of low-creep configuration was also created, which is designed and configured as shown in FIGS. 5(*a*), 5(*b*) and 6(*a*). In this bearing, the surface pressure distributions generated by any adjacent rolling elements 3 overlap with each other so as to satisfy the relation $\sigma_1/4 < \sigma_2$.

The results of the analysis are shown in Table 1 below, separately for the bearings of high-creep configuration and low-creep configuration.

TABLE 1

|  | Inboard side | | | Outboard side | | |
|---|---|---|---|---|---|---|
|  | Surface pressure | | | Surface pressure maximum value ratio | | |
|  | Maximum value ratio | Amplitude/ average | Ratio of creeping | Maximum value ratio | Amplitude/ average | Ratio of creeping |
| Bearing of high-creep configuration | 1 | 0.6 | 1 | 1 | 0.5 | 1 |
| Bearing of low-creep configuration | 0.6 | 0.04 | 2.E−03 | 0.6 | 0.06 | 1.E−03 |

※Ratio values are ratios to the corresponding values of the bearing of high-creep configuration.

Figure 11:
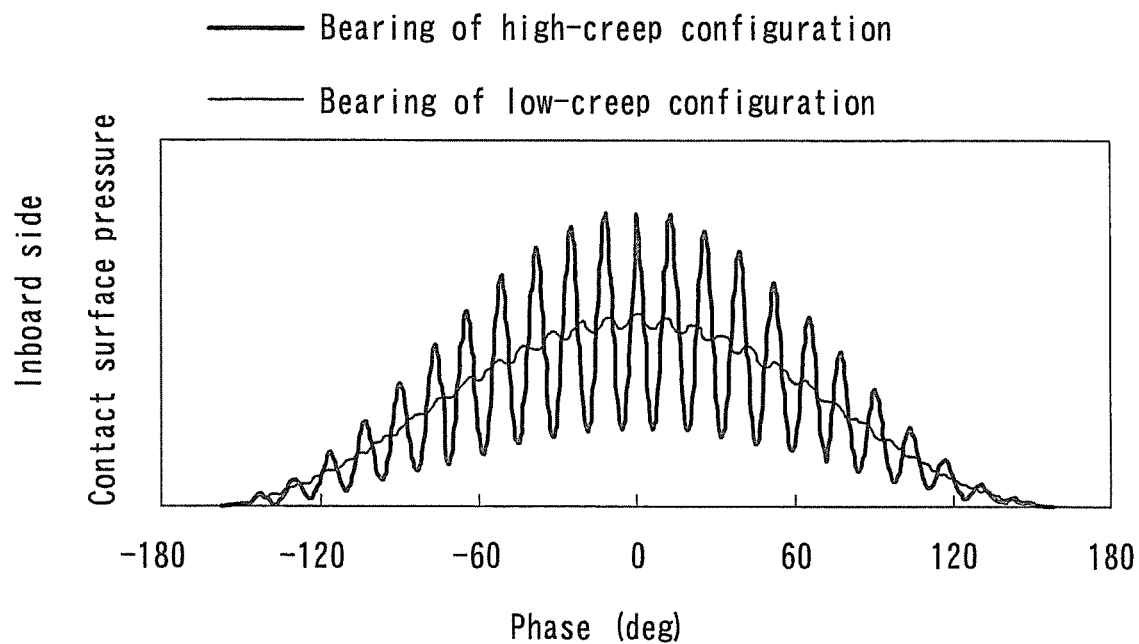
FIG. 11 is a graph showing a difference between contact surface pressures (surface pressure distributions) produced in a bearing of low-creep configuration and in a bearing of high-creep configuration, respectively.
Figure 12:
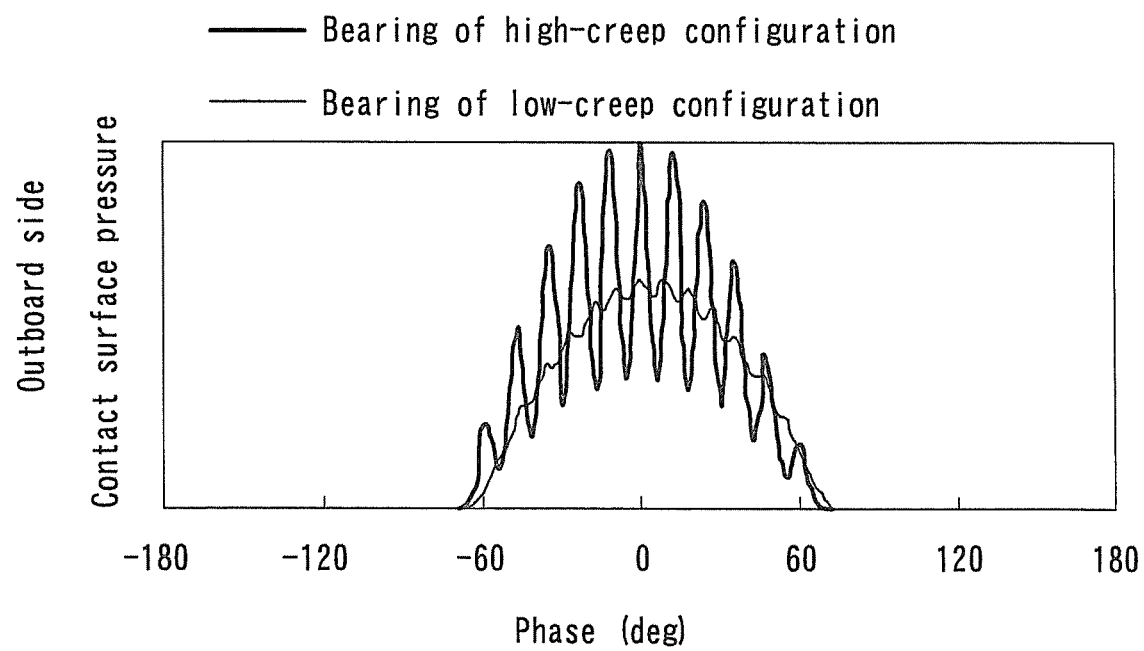
FIG. 12 is a graph showing a difference between contact fitting surface pressures (surface pressure distributions) produced in a bearing of low-creep configuration and in a bearing of high-creep configuration, respectively.
Figure 18:
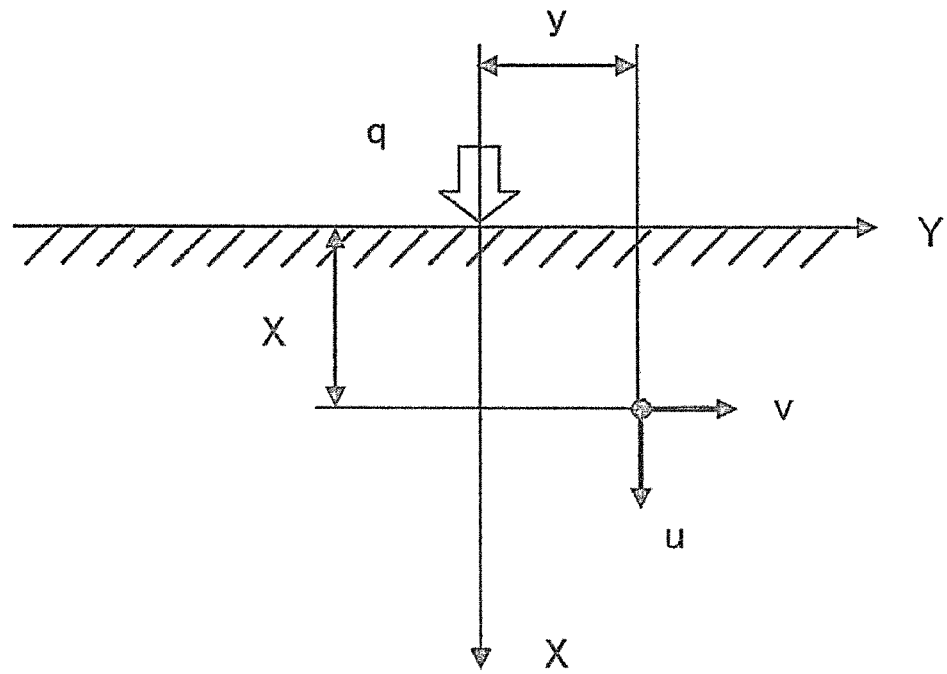
FIG. 18 schematically shows positional relationship in the depth direction and the circumferential direction relative to a loading point on the inner race.
Figure 19:
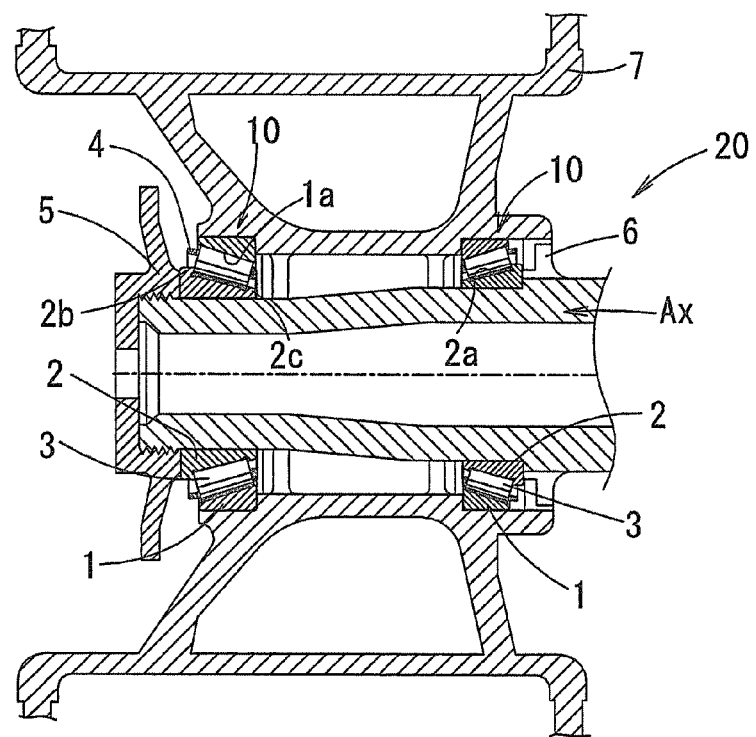
FIG. 19 is a sectional view of a wheel bearing assembly.
Figure 20:
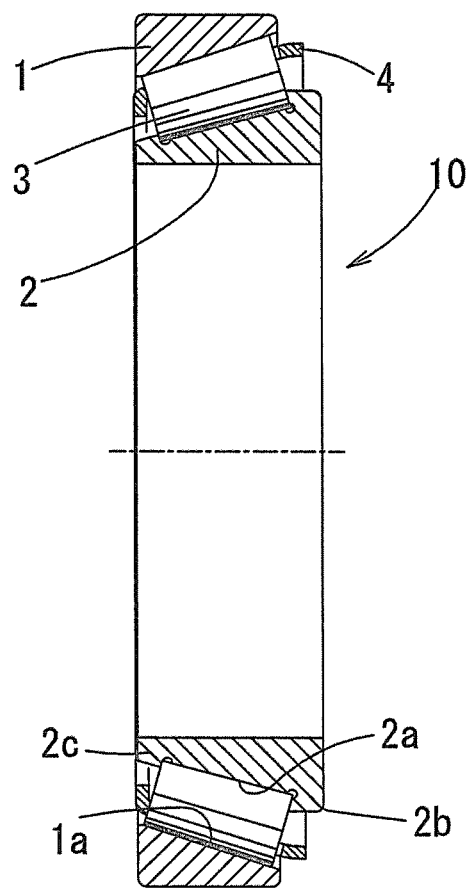
FIG. 20 is an enlarged view of a rolling bearing in the wheel bearing assembly of FIG. 19.

FIG. 11 shows the surface pressure distribution of the inner race 2 of the inboard rolling bearing 10 in a front wheel bearing assembly 20. FIG. 12 shows the surface pressure distribution of the inner race 2 of the outboard rolling bearing 10 in the bearing assembly 20.

In FIGS. 13 and 14, different colors are used to show fitting surface pressures of different magnitudes.

FIGS. 13(*a*) and 13(*b*) show the surface pressure distributions of the inner races 2 of the inboard and outboard rolling bearings 10 in a front wheel bearing assembly 20, of which the bearings 10 are of high-creep configuration. FIGS. 14(*a*) and 13(*b*) show the surface pressure distributions of the inner races 2 of the inboard and outboard rolling bearings 10 in a rear wheel bearing assembly 20, of which the bearings 10 are of low-creep configuration.

From the above results, it will be understood that a bearing of low-creep configuration is lower in the degree of creeping than a bearing of high-creep configuration due to the fact that the surface pressure distribution of the former bearing is more uniform than the latter bearing. As shown in FIGS. 11 and 12, in the bearings of high-creep configuration, the amplitude/average values (the ratio of the fluctuation amplitude of surface pressure to the average surface pressure) are significantly larger than the amplitude/average values in the bearings of low-creep configuration, which are all 0.1 or less.

In this simulation, analysis was made on the assumption that the bearings of high-creep configuration and those of low-creep configuration are used in identical wheel bearing assemblies 20, and that the rolling bearings 10 are all identical in sectional height, identical in shape and dimension of the outer race 1 and thus its raceway 1*a*, and identical in diameter of the bore of the inner race 2.

As a result of a number of FEM analyses, it was discovered that by determining the values σmid and σmax shown in FIG. 17(*a*) so as to satisfy the relation σmid/σmax>0.5 (σmid>σmax/2), creeping can be always kept to zero or nearly zero irrespective of the dimension w, as shown in FIG. 17(*b*).

In designing a rolling bearing 10 of low-creep configuration based on a rolling bearing 10 of high-creep configuration, it is possible to increase the surface pressure value at a crossing point $\sigma_2$ to the surface pressure value at the peak point of by shortening the circumferential distances between the adjacent rolling elements 3.

For example, the circumferential distances between the adjacent rolling elements 3 decrease by changing the design of the rolling bearing 10 shown in FIG. 6(*b*), which is of high-creep configuration, to the design of the rolling bearing 10 shown in FIG. 6(*a*), which is of low-creep configuration.

The bearings 10 of high-creep configuration and low-creep configuration are identical in sectional height D, diameter R2 of the bore of the inner race 2, and outer diameter of the outer race 1.

These two bearings are also identical in shape and dimensions of the outer race 1, and further identical in diameter R1 of the raceway 1*a* of the outer race 1 (diameter of the raceway 1*a* at the axial center of the contact area between the rolling elements 3 and the raceway 1*a*), and thus in contact angle. But the bearing of low-creep configuration includes rolling elements 3 having a diameter dw1 which is smaller than the diameter dw0 of the rolling elements 3 of the bearing of high-creep configuration. Since the diameter dw1 is smaller than the diameter dw0, larger spaces are present between the adjacent rolling elements 3, which makes it possible to shorten the circumferential distances between the adjacent rolling elements 3 in the bearing of low-creep configuration.

This also makes it possible to increase the wall thickness t of the inner race 2 (from t0 to t1), thus increasing the rigidity of the inner race 2, which also serves to reduce creeping between the axle Ax and the inner race 2.

But if there is a sufficiently large space between the outer race 1 and the inner race 2, and if the retainer 4 is of sufficient strength, the rolling elements 3 may have a relatively large diameter dw. For example, the circumferential distances 2*s* between the adjacent rolling elements 3 may be reduced without reducing the diameter dw of the rolling elements 3.

If the outer race 1 is of sufficient strength, the circumferential distances 2*s* between the adjacent rolling elements 3 may be reduced by reducing the wall thickness of the outer race 1. It is also possible to change a bearing of high-creep configuration to a bearing of low-creep configuration by changing the contact angle $\alpha$ and/or the effective contact length L between the inner race 2 and the rolling elements 3.

In order to design a bearing of low-creep configuration regarding creeping between the outer race 1 and the housing H, the outer race 1 and the inner race 2 are designed in the same manner as the respective inner and outer races 2 and 1 are designed above to reduce creeping between the inner race and the axle.

In particular, in this case, the bearing of low-creep configuration is identical in shape and dimensions of the inner race 2 to the bearing of high-creep configuration. If the diameter R2 of the raceway 2*a* of the inner race 2 (at the axial center of the contact area between the raceway 2*a* and the rolling elements 3) and the contact angle of the bearing of low-creep configuration are also identical to those of the bearing of high-creep configuration, the rolling elements 3 of the bearing of low-creep configuration are smaller in diameter dw than those of the bearing of high-creep configuration. Since the diameter dw of the rolling elements 3 are small, correspondingly larger spaces are present between the adjacent rolling elements 3, which makes it possible to reduce the circumferential distances 2*s* between the adjacent rolling elements 3.

This also makes it possible to correspondingly increase the wall thickness t of the outer race 1, thus increasing the rigidity of the outer race 1, which also serves to reduce creeping between the outer race 1 and the housing H.

The rolling bearing 10 of any of the above-described arrangements is a tapered roller bearing, of which the rolling elements 3 are tapered rollers. But the present invention is applicable to other rolling bearings 10, such as those including rollers as the rolling elements 3, including cylindrical roller bearings, needle roller bearings and self-aligning bearings, as well as ball bearings, of which the rolling elements 3 are balls.

Figure 7:
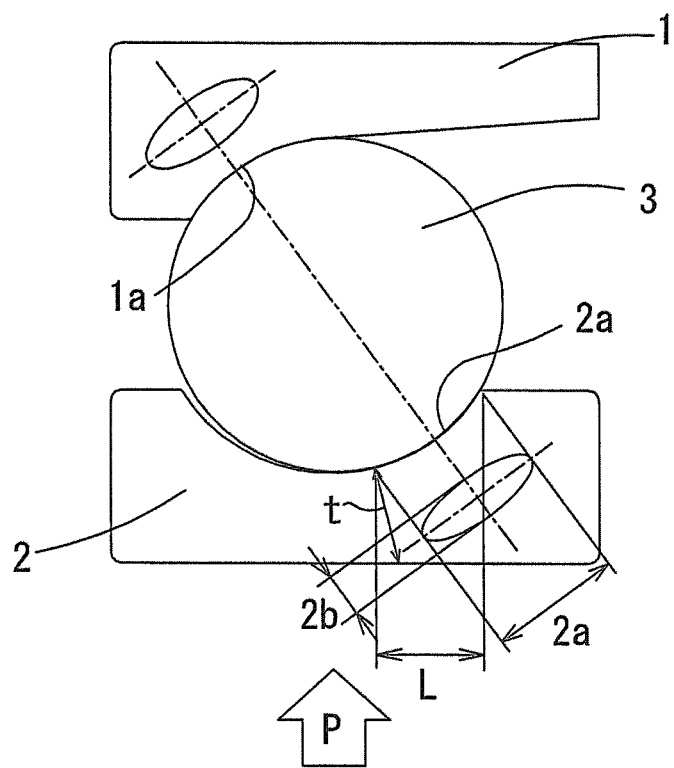
FIG. 7 shows how a rolling element contacts raceways.

If a ball bearing, particularly an angular ball bearing as shown in FIG. 7, is used, due to elastic deformation of the members having raceways and the balls, the contact areas therebetween are formed into an oval shape having a major axis 2*a* and a minor axis 2*b*. Similar oval contact areas form in deep groove ball bearings too.

The wall thickness t of the inner race 2 or the outer race 1, as used in the above calculation, is the minimum thickness of the inner race 2 or the outer race 1 at the above-mentioned oval contact area, in the direction perpendicular to the raceway.

Thus in the case of a deep groove ball bearing, the wall thickness t is ordinarily the thickness of the inner race 2 or the outer race 1 at the deepest portion of the raceway, in the radial direction of the bearing. In case of a bearing in which the rolling elements 3 contact the raceways with a contact angle, such as an angular contact bearing, the wall thickness t is the minimum thickness of the portion of the inner race 2 or the outer race 1 at the above-mentioned contact area, in the direction perpendicular to the raceway.

The effective contact length L between the respective rolling elements 3 and each of the raceway 2*a* and 1*a* of the inner race 2 and the outer race 1 is the axial length of the above-mentioned oval contact areas, i.e. the axial component L of the major axis 2*a* shown.

The contact angle $\alpha$ between the respective rolling elements 3 and each raceway is zero in the case of a deep groove ball bearing. If the contact angle $\alpha$ is not zero, it is the contact angle measured at the axial center of each oval contact area.

The above embodiments and experiment examples are examined based on the mechanism by which creeping occurs between the axle and the inner race, which are stationary, or between the housing and the outer race.

Principle 1: Mechanism by which creeping occurs in the direction in which the bearing race rotates The mechanism is first described by which the stationary bearing race creeps in the direction in which the rotating bearing race rotates.

When the rolling elements 3 roll on the raceway of e.g. the inner race 2, minute protrusions form on portions of the radially inner surface of an inner race 2 (surface facing the axle Ax) that are radially aligned with the respective rolling elements 3, because the inner race 2 (or any other object) has more or less elasticity. For better understanding, FIG. 8(*b*) shows such minute protrusions when the inner race 2 of the bearing shown in FIG. 8(*a*), which is actually annular in shape, is developed into a flat plate.

The minute protrusions, which are formed by the respective rolling elements 3, form wavefronts on the radially inner surface of the inner race 2. When the rolling elements 3 move in the direction x3 in FIG. 8(*b*), the wavefronts move in the arrow x2 together with the respective rolling elements 3. Thus, the wavefronts move as surface waves in the direction of the arrow x4 in FIG. 8(*c*).

These surface waves are surface acoustic waves called Rayleigh waves. It is known that an object pressed against such surface waves is moved in the opposite direction in which the surface waves are moving. This principle is used in ultrasonic motors, which are widely used to drive auto-focusing mechanisms of cameras.

Figure 9:
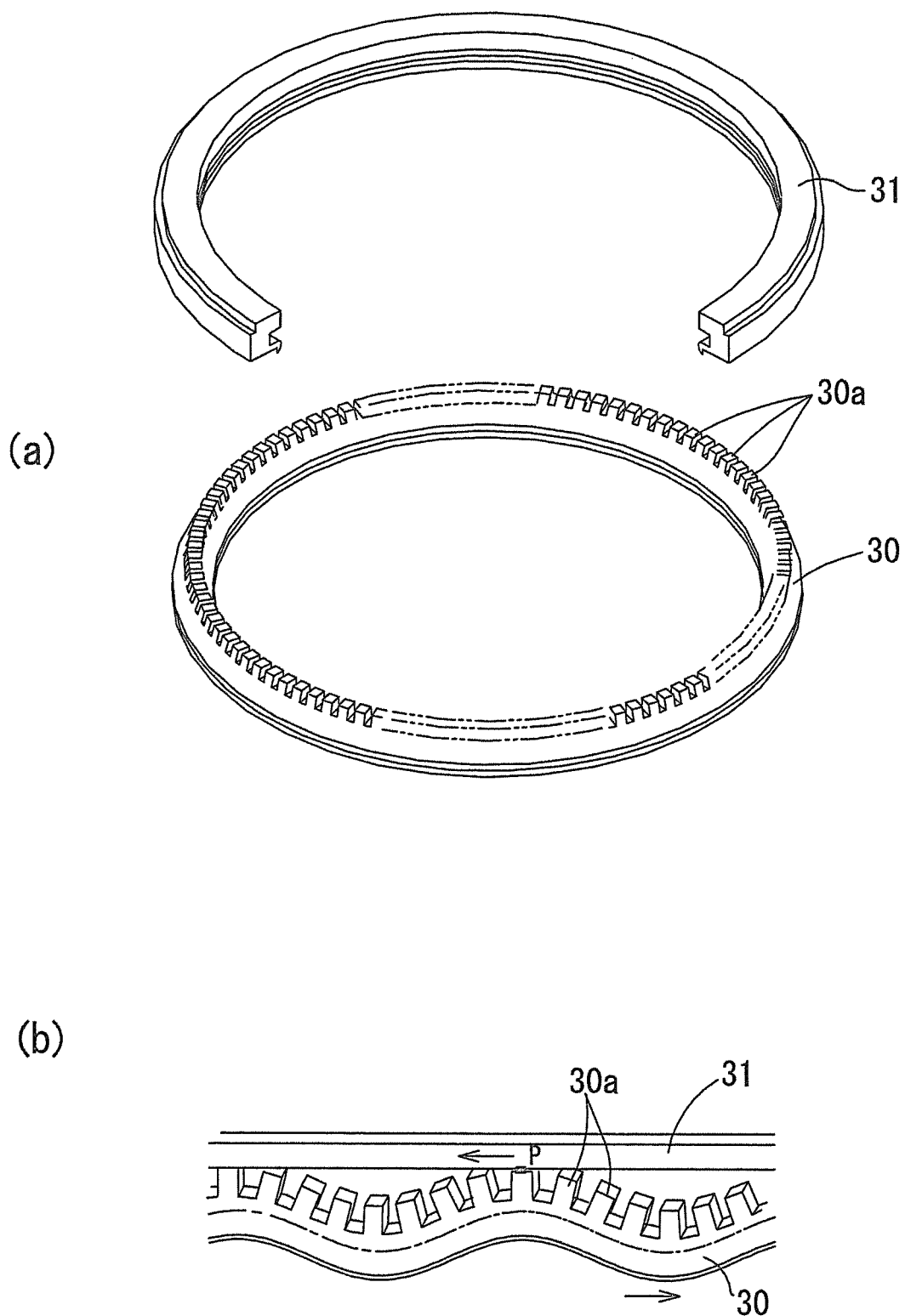
FIGS. 9(a) and 9(b) are reference views showing the mechanism of how creeping occurs.

As is well known from the principle of ultrasonic motors, surface acoustic waves move an object in the direction opposite to the direction in which the waves are moving, in the manner as shown in FIG. 9. An ultrasonic motor is an actuator which converts the oscillation energy of an oscillator to the rotation of a rotor or a linear motion of a slider by means of a frictional force.

FIG. 9(a) shows such an oscillator 30. The oscillator 30 carries projections 30a on its surface to amplify displacement. FIG. 9(a) also shows a rotor 31. When the oscillator produces surface acoustic waves that proceed rightwardly in FIG. 9(b) as shown in FIG. 9(b), any point p of any projection 30a oscillates in an oval pattern. This causes the rotor 31 to move leftwardly in the figure.

Figure 10:
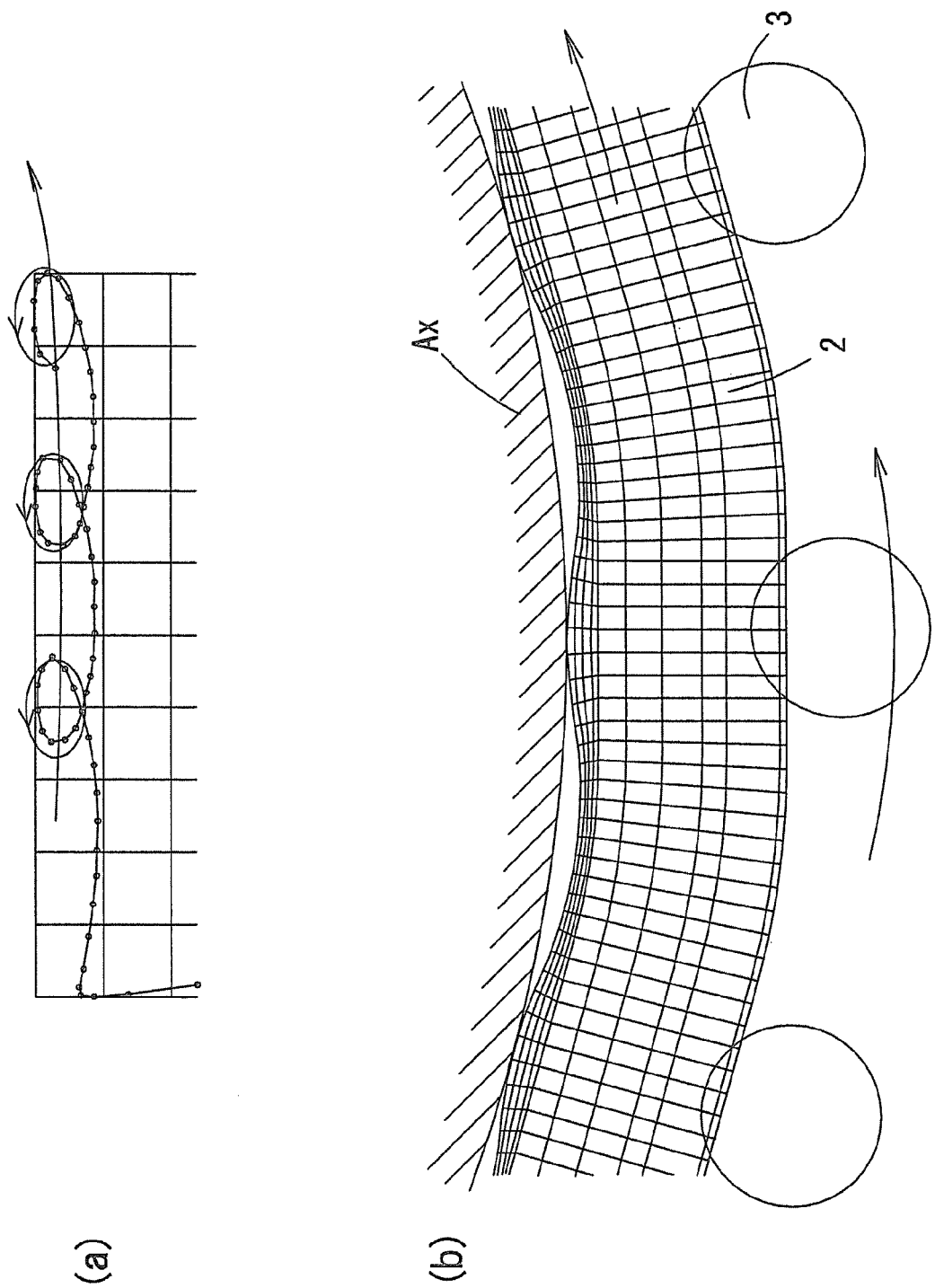
FIGS. 10(a) and 10(b) are reference views showing the mechanism of ultrasonic motors.

The same thing could occur in a bearing too. In particular, when the rolling elements 3 of the bearing move rightwardly in FIG. 10(b) on the inner race 2 of the bearing, which corresponds to the above-described oscillator 30, progressive waves in the rightward direction of FIG. 10(b) are produced on the radially inner surface of the inner race 2 (surface facing the axle Ax). The progressive waves cause any point p on the radially inner surface of the inner race 2 to be oscillated counterclockwise in an oval pattern as shown in FIG. 10(a). This oval-shaped oscillation tends to move the axle Ax, which corresponds to the above-described rotor 31, leftwardly in FIG. 10(b).

In the case of a bearing, the rolling elements 3 move in the direction in which surface acoustic waves move, the inner race 2 tends to move the axle Ax in the direction opposite to the direction in which the rolling elements 3 move. But since the axle Ax is fixed in position, the inner race 2 itself is moved in the direction opposite to the direction opposite to the direction in which the rolling elements 3 move, i.e. moved in the same direction in which the rolling elements 3 move.

This is the mechanism by which the stationary bearing race creeps in the same direction as the rotating direction of the bearing.

Principle 2: Depth at which no surface acoustic waves are produced

Regarding displacement of an internal coordinate of a continuous body when a load is applied to the continuous body, general solutions are obtained as equations of Boussinesq (see e.g. Reference: Mechanics of Materials, Volume 2; published by YOKENDO; written by Ichiro Nakahara, Honorary Professor, Tokyo Institute of Technology; Chapter 6: Contact Stress). They are shown below (definitions are omitted):

$$u = -q \cdot \{y^3/(r^2) + 2(1-v) \cdot \log(r/B)\}/(2 \cdot \pi \cdot G)$$

$$v = -q \cdot \{(x \cdot y)/(r^2) + (1-2v) \cdot \tan - (y/x)\}/(2 \cdot \pi \cdot G)$$

But no documents are known in which displacement of an internal coordinate is described in detail when the following conditions are met:

(1) There are a plurality of loading points.
(2) The loading points are spaced from each other.
(3) The loading points move.

The inventor prepared a special program to numerically inspect the above-described unobvious function. As a result, as shown in FIG. 15, it was discovered that internal points make oval movements when the loading points move. More importantly, it was discovered, as shown in FIG. 16, that while the size of the oval movements depends on the loads applied and the distance W between the loading points, such oval movements almost completely disappear at a certain depth.

The following parameters were used in the above analysis.
A: Amplitude of surface acoustic waves, or amplitude of internal oval movements
X: Distance in the depth direction from a point at which a vertical load is applied
y: Distance from a point at which a vertical load is applied in a direction perpendicular to the vertical load
u: Distance by which the internal point moves in the depth direction when the vertical load is applied
v: Distance by which the internal point moves in a direction perpendicular to the vertical load It was discovered that the above parameters satisfy the relation:

Depth $X$/Distance $W$ between loading points>0.5

In designing a bearing, since the above-mentioned depth X can be regarded as the wall thickness t of one of the outer race and the inner race to which the loads from the rolling elements are applied, by determining the wall thickness t to satisfy the relation:

Wall thickness $T$/Distance $w$ between adjacent rolling elements>0.5, it is possible to substantially eliminate the above-mentioned surface acoustic waves, thereby preventing creeping in principle. The word "substantially" is used above because if the bearing is e.g. a tapered roller bearing, suitable correction is necessary according to the contact angle between the raceway and the rolling elements.

Experience Values by FEM Analysis

In a situation where loads are applied in a complicated manner, such as loads applied to a tapered bearing, loads applied from the rolling elements were calculated using a known equation such as that of Jones or Harris. FEM analysis was performed using the thus calculated loads to determine whether creeping occurred.

During the analysis, it was discovered that there was a correlation between the amount of creeping and the contact surface pressure distributions.

From experience, it was confirmed that the bearing is free of creeping if the following relation is met:

$$\sigma mid > \sigma max/2$$

where σmax is the maximum surface pressure of the above-mentioned combined surface pressure distribution, and σmid is the minimum surface pressure at the troughs of the combined surface pressure, which are located circumferentially adjacent to σmax.

Coincidence of Principles 1 and 2 with the Experience Rule by FEM Analysis

The experience rule by FEM analysis reveals that the bearing is free of creeping if the following relation is met:

$$\sigma mid > \sigma max/2$$

By performing static FEM analysis to check if the above relation is met, it is possible to approximately determine whether or not the bearing is free of creeping without performing high-load FEM analysis such as dynamic FEM analysis or FEM analysis in which time integration is used. It is thus possible to save time and money.

The above-mentioned combined surface pressure is the combination of the circumferentially adjacent surface pressure distributions applied from the adjacent rolling elements 3 to the inner race 2. If the experience rule by FEM analysis is shown using the surface pressure generated by the one rolling element 3, the following relations are met, as is apparent from FIG. 3:

$$\sigma_1 \approx \sigma max$$

$$\sigma_2 \approx \sigma mid/2$$

The relation σmid>σmax/2 can thus be changed to:

$$\sigma_1/4 < \sigma_2$$

Thus, it is possible to approximately determine whether or not the bearing is free of creeping by checking whether or not this relation is met based on the stress formulas by Boussinesq. This saves time and cost.

$$\sigma_1 = 2qt^3/\{\pi t^4\}$$

$$\sigma_2 = 2qt^3/\{\pi(t^2+s^2)^2\}$$

$$q = P/L$$

$$s = \pi \times SD/(2Z)$$

Since the relation s=w/2 is met as shown in FIG. 8, the equation:

$$s = \pi \times SD/(2Z)$$

can be changed to:

$$w = \pi \times PCD/Z.$$

Based on the equations:

$$\sigma_1 = 2qt^3/\{\pi t^4\}$$

and $$\sigma_2 = 2qt^3/\{\pi(t^2+(w/2)^2)^2\},$$

the relation:

$$\sigma_1/4 < \sigma_2$$

can be changed to:

$$t/w > 0.5.$$

Thus basically, the results shown in Principles 1 and 2 coincide with the experiment rule by FEM analysis. Thus, it will be understood that the relation σmid>σmax/2, which has been obtained based on experience, as well as the generalized relation $\sigma_1/4 < \sigma_2$ are based on the above principles.

It is possible, in principle, to determine whether or not the bearing is free of creeping simply by checking whether or not the various dimensions satisfy the above requirements, without the need for complicated technical calculations.

Coincidence with Test Results

It was confirmed in an actual creep test that bearings that satisfy the relation t/w>0.5 suffered no creeping. This clearly indicates that by designing a bearing to satisfy the relation: Wall thickness t/Distance w between adjacent rolling bearings >0.5, movement of the bearing races due to surface acoustic waves decreases to such an extent creeping is fundamentally prevented.

What is claimed is:

1. A rolling bearing comprising an outer race having a raceway, an inner race having a raceway, and rolling elements disposed between the raceways of the outer race and the inner race, wherein the inner race is formed with a bore through which a shaft can be fitted,
   wherein the bearing is designed and configured such that with the shaft fitted through the bore of the inner race, when a bearing load is applied between the outer race and the shaft and due to the bearing load, a peak load P is applied to the inner race from one of the rolling elements which receives a largest portion of the bearing load among the rolling elements, a first circumferential surface pressure distribution generated on the inner race by the one of the rolling elements circumferentially overlaps with each of second circumferential surface pressure distributions generated on the inner race by respective rolling elements circumferentially adjacent to the one of the rolling elements, and
   wherein the bearing is further designed and configured to satisfy one of below-identified first to third relations:
first relation:

$$t/w > 0.5$$

where t is a minimum thickness of a portion of the inner race where the rolling elements contact the raceway of the inner race, in a direction perpendicular to the raceway of the inner race; and $$w = \pi \times SD/Z$$

where Z is the number of the rolling elements; and
SD is an inner diameter of the bearing;
second relation:

$$\sigma mid > \sigma max/2$$

where σmid and σmax are minimum and maximum values, respectively, of a combined circumferential surface pressure distribution which is a combination of the first circumferential surface pressure distribution and the second circumferential pressure distributions; and
third relation:

$$\sigma_1/4 < \sigma_2$$

where $\sigma_2$ is a surface pressure value applied to the inner race from the one of the rolling elements at a crossing point where a curve representing the first circumferential surface pressure distribution crosses a curve representing each of the second circumferential surface pressure distributions; and
$\sigma_1$ is a maximum value of the first circumferential surface pressure distribution, and
   wherein $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the inner race (2) where the rolling elements (3) contact the raceway (2a) of the inner race (2), in a direction perpendicular to the raceway (2a) of the inner race;

$$q = P/L;$$

and $$s = \pi \times \times SD/(2Z)$$

where L is an axial effective contact length between the one of the rolling elements and the raceway of the inner race;
Z is the number of the rolling elements; and
SD is an inner diameter of the bearing.

2. The rolling bearing of claim 1, wherein the inner race (2) and the shaft are kept stationary and the outer race is configured to be rotated, and wherein the shaft is fitted through the inner race with a clearance fit.

3. The rolling bearing of claim 1, wherein the bearing is designed and configured to satisfy said first relation.

4. The rolling bearing of claim 1, wherein the bearing is designed and configured to satisfy said second relation.

5. The rolling bearing of claim 1, wherein the bearing is designed and configured to satisfy said third relation.

6. A rolling bearing comprising an outer race having a raceway, an inner race having a raceway, and rolling elements disposed between the raceways of the outer race and the inner race, wherein the outer race can be fitted in a housing;

wherein the bearing is designed and configured such that with the outer race fitted in the housing, when a bearing load is applied between the inner race and the housing and due to the bearing load, a peak load P is applied to the outer race from one of the rolling elements which receives a largest portion of the bearing load among the rolling elements, a first circumferential surface pressure distribution generated on the outer race by the one of the rolling elements circumferentially overlaps with each of second circumferential surface pressure distributions generated on the outer race by respective rolling elements circumferentially adjacent to the one of the rolling elements, wherein the bearing is further designed and configured to satisfy one of below-identified first to third relations:

first relation:

$$t/w > 0.5$$

where t is a minimum thickness of a portion of the outer race where the rolling elements contact the raceway of the outer race, in a direction perpendicular to the raceway of the outer race; and $$w = \pi \times LD/Z$$

where Z is the number of the rolling elements (3); and
LD is an outer diameter of the bearing;
second relation;

$$\sigma mid > \sigma max/2$$

where $\sigma mid$ and $\sigma max$ are minimum and maximum values, respectively, of a combined circumferential surface pressure distribution which is a combination of the first circumferential surface pressure distribution and the second circumferential surface pressure distributions; and third relation;

$$\sigma_1/4 < \sigma_2$$

where $\sigma_2$ is a surface pressure value applied to the outer race from the one of the rolling elements at a crossing point where a curve representing the first circumferential surface pressure distribution crosses a curve representing each of the second circumferential surface pressure distributions; and
$\sigma_1$ is a maximum value of the first circumferential surface pressure distribution, and
wherein $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the outer race where the rolling elements contact the raceway of the outer race, in a direction perpendicular to the raceway of the outer race;

$$q = P/L;$$

and $$s = \pi \times LD/(2Z)$$

where L is an axial effective contact length between the one of the rolling elements and the raceway of the outer race;

Z is the number of the rolling elements; and
LD is an outer diameter of the bearing.

7. The rolling bearing of claim 6, wherein the outer race and the housing are kept stationary, and the inner race is configured to be rotated, and wherein the outer race is fitted in the housing with a clearance fit.

8. The rolling bearing of claim 6, wherein the bearing is designed and configured to satisfy said first relation.

9. The rolling bearing of claim 6, wherein the bearing is designed and configured to satisfy said second relation.

10. The rolling bearing of claim 6, wherein the bearing is designed and configured to satisfy said third relation.

11. A method of designing a rolling bearing comprising an outer race having a raceway, an inner race having a raceway, and rolling elements disposed between the raceways of the outer race and the inner race, wherein the inner race is formed with a bore through which a shaft can be fitted, wherein the bearing is designed such that with the shaft fitted through the bore of the inner race, when a bearing load is applied between the outer race and the shaft and due to the bearing load, a peak load P is applied to the inner race from one of the rolling elements which receives a largest portion of the bearing load among the rolling elements, a first circumferential surface pressure distribution generated on the inner race by the one of the rolling elements circumferentially overlaps with each of second circumferential surface pressure distributions generated on the inner race by respective rolling elements circumferentially adjacent to the one of the rolling elements, wherein the bearing is further designed to satisfy one of below-identified first and second relations:

first relation;

$$\sigma mid > \sigma max/2$$

where $\sigma mid$ and $\sigma max$ are minimum and maximum values, respectively, of a combined circumferential surface pressure distribution which is a combination of the first circumferential surface pressure distribution and the second circumferential surface pressure distributions; and second relation:

$$\sigma_1/4 < \sigma_2$$

where $\sigma_2$ is a surface pressure value applied to the inner race from the one of the rolling elements at a crossing point where a curve representing the first circumferential surface pressure distribution crosses a curve representing each of the second circumferential surface pressure distributions; and
$\sigma_1$ is a maximum value of the first circumferential surface pressure distribution, and
wherein $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the inner race where the rolling elements contact the raceway of the inner race, in a direction perpendicular to the raceway of the inner race;

$$q = P/L;$$

and $$s = \pi \times SD/(2Z)$$

where L is an axial effective contact length between the one of the rolling elements and the raceway of the inner race;
Z is the number of the rolling elements; and
SD is an inner diameter of the bearing.

12. The method of claim 11, wherein creeping which is expected to be generated between the inner race and the shaft when the peak load is applied is calculated by a finite element method (FEM) analysis, and the bearing is designed such that the creeping thus calculated is not larger than a predetermined value.

13. The method of claim 12, wherein the creeping is one rotation or less during the lifecycle of the rolling bearing.

14. The method of claim 11, wherein the bearing is designed to satisfy said first relation.

15. The method of claim 11, wherein the bearing is designed to satisfy said second relation.

16. A method of designing a rolling bearing comprising an outer race (1) having a raceway, an inner race having a raceway, and rolling elements disposed between the raceways of the outer race and the inner race, wherein the outer race can be fitted in a housing;
wherein the bearing is designed such that with the outer race fitted in the housing, when a bearing load is applied between the inner race and the housing and due to the bearing load, a peak load P is applied to the outer race from one of the rolling elements which receives a largest portion of the bearing load among the rolling elements, a first circumferential surface pressure distribution generated on the outer race by the one of the rolling elements circumferentially overlaps with each of second circumferential surface pressure distributions generated on the outer race by respective rolling elements circumferentially adjacent to the one of the rolling elements,
wherein the bearing is further designed to satisfy one of below-identified first and second relations:
first relation:

$$\sigma mid > \sigma max/2$$

where $\sigma mid$ and $\sigma max$ are minimum and maximum values, respectively, of a combined circumferential surface pressure distribution which is a combination of the first circumferential surface pressure distribution and the second circumferential surface pressure distributions; and
second relation:

$$\sigma_1/4 < \sigma_2$$

where $\sigma_2$ is a surface pressure value applied to the outer race from the one of the rolling elements at a crossing point where a curve representing the first circumferential surface pressure distribution crosses a curve representing each of the second circumferential surface pressure distributions; and
$\sigma_1$ is a maximum value of the first circumferential surface pressure distribution, and
wherein $\sigma_1$ and $\sigma_2$ are given by:

$$\sigma_1 = 2qt^3/\{\pi t^4\}$$

and $$\sigma_2 = 2qt^3/\{\pi(t^2+s^2)^2\}$$

where t is a minimum thickness of a portion of the outer race where the rolling elements contact the raceway of the outer race, in a direction perpendicular to the raceway of the outer race;

$$q = P/L;$$

and $$s = \pi \times LD/(2Z)$$

where L is an axial effective contact length between the one of the rolling elements and the raceway of the outer race;
Z is the number of the rolling elements; and
LD is an outer diameter of the bearing.

17. The method of claim 16, wherein creeping which is expected to be generated between the outer race and the housing when the peak load is applied is calculated by a finite element method (FEM) analysis, and the bearing is designed such that the creeping thus calculated is smaller than a predetermined value.

18. The method of claim 17, wherein the creeping is one rotation or less during the lifecycle of the rolling bearing.

19. The method of claim 16, wherein the bearing is designed to satisfy said first relation.

20. The method of claim 16, wherein the bearing is designed to satisfy said second relation.

* * * * *